US011896109B2

(12) United States Patent
Holtzman et al.

(10) Patent No.: US 11,896,109 B2
(45) Date of Patent: Feb. 13, 2024

(54) SYSTEMS, METHODS, AND APPARATUSES FOR A CARTRIDGE-BASED COSMETIC PRODUCT DISPENSING SYSTEM

(71) Applicant: IM Pro Makeup NY LP, New York, NY (US)

(72) Inventors: Oran Holtzman, New York, NY (US); Maayan Gianella, Tel Aviv (IL)

(73) Assignee: IM Pro Makeup NY LP, New York, NY (US)

( * ) Notice: Subject to any disclaimer, the term of this patent is extended or adjusted under 35 U.S.C. 154(b) by 0 days.

(21) Appl. No.: 17/248,139

(22) Filed: Jan. 11, 2021

(65) Prior Publication Data

US 2021/0212437 A1 Jul. 15, 2021

Related U.S. Application Data

(63) Continuation-in-part of application No. 16/947,933, filed on Aug. 24, 2020, now Pat. No. 11,117,149.

(60) Provisional application No. 62/890,565, filed on Aug. 22, 2019.

(51) Int. Cl.

| | |
|---|---|
| ***A45D 34/00*** | (2006.01) |
| ***A45D 40/24*** | (2006.01) |
| ***B05B 11/00*** | (2023.01) |
| ***B05B 11/10*** | (2023.01) |

(52) U.S. Cl.

CPC ............. *A45D 34/00* (2013.01); *A45D 40/24* (2013.01); *B05B 11/0054* (2013.01); *B05B 11/1045* (2023.01); *A45D 2034/005* (2013.01); *A45D 2200/055* (2013.01); *A45D 2200/056* (2013.01)

(58) Field of Classification Search

CPC .. A45D 34/00; A45D 40/24; A45D 2034/005; A45D 2200/055; B05B 11/0054; B05B 11/3045; B05B 11/0038; B05B 11/0041; B05B 11/3074; B05B 11/3047; B05B 11/3084

USPC ........................ 222/321.7, 321.9, 321.1, 256

See application file for complete search history.

(56) References Cited

U.S. PATENT DOCUMENTS

| | | | | |
|---|---|---|---|---|
| 5,104,009 | A * | 4/1992 | Battegazzore | B65D 83/0033 222/327 |
| 6,047,862 | A * | 4/2000 | Davies | B05B 11/3047 222/327 |
| 8,631,975 | B2 * | 1/2014 | Lim | B05B 11/3011 222/387 |
| 9,370,790 | B2 * | 6/2016 | Kim | B05B 15/14 |
| 10,342,313 | B2 * | 7/2019 | Kang | B65D 83/205 |

(Continued)

FOREIGN PATENT DOCUMENTS

| | | | |
|---|---|---|---|
| JP | 2000-255636 | * | 9/2000 |
| WO | WO 2018/114301 A1 | * | 6/2018 |

*Primary Examiner* — Lien M Ngo

(74) *Attorney, Agent, or Firm* — Duncan Galloway Greenwald PLLC; Kevin T. Duncan

(57) ABSTRACT

The present application relates to the design of a class of beauty products that facilitates personalized replenishment. The physical product is a new type of dispenser comprising a pump assembly and a sleeve or housing for containing a replaceable cartridge of a specific type of product, such as a foundation. The cartridge is an air-less cartridge that may be releasably secured to the dispenser or pump assembly such that a user may remove the cartridge from the dispenser or pump and replace the cartridge with another cartridge containing the same or a different product.

17 Claims, 33 Drawing Sheets

(56) References Cited

U.S. PATENT DOCUMENTS

| | | | | |
|---|---|---|---|---|
| 11,084,646 | B1 * | 8/2021 | Hwang | A45D 34/00 |
| 2014/0231464 | A1 * | 8/2014 | Cho | A45D 34/04<br>222/256 |
| 2020/0178671 | A1 * | 6/2020 | Edwards | B05B 12/1409 |
| 2020/0376510 | A1 * | 12/2020 | Erlhöfer | B05B 11/3045 |
| 2023/0022130 | A1 * | 1/2023 | Lee | B05B 11/00 |

* cited by examiner

SYSTEMS, METHODS, AND APPARATUSES FOR A CARTRIDGE-BASED COSMETIC PRODUCT DISPENSING SYSTEM

CROSS-REFERENCE AND CLAIM OF PRIORITY

The present application is a continuation-in-part of and claims the benefit of priority to U.S. patent application Ser. No. 16/947,933, entitled SYSTEMS, METHODS, AND APPARATUSES FOR A CARTRIDGE DISPENSING SYSTEM AND RETENTION MECHANISM, filed 24 Aug. 2020, by Holtzman, which claims the benefit of priority to U.S. Provisional Pat. App. No. 62/890,565, entitled SYSTEMS, METHODS, AND APPARATUSES FOR A CARTRIDGE DISPENSING SYSTEM AND RETENTION MECHANISM, filed 22 Aug. 2019, by Holtzman, both of which are incorporated by reference herein in the entirety.

FIELD OF THE INVENTION

The present application relates to dispensing systems for dispensing fluid cosmetic products that facilitates personalized replenishment.

BACKGROUND OF THE INVENTION

There are some beauty products, including foundation, skincare, concealer, primer, and a range of other complex beauty products, that consumers replenish frequently. For these products, rather than seeking newness and variety, consumers consistently purchase the same product. Due to all the packaging typically used with beauty products, replenishing a consumer's product is expensive. High-end brands can have especially expensive packaging and ecommerce brands may be burdened with the extra expense of shipping costs based on volume and weight. This means the consumer ends up with a high price tag for no reason.

What is needed is a product that provides for less expensive replenishment while maintaining an elevated consumer experience that is both seamless and fun. Such a product would increase customer loyalty to the brand providing it by dramatically decreasing the cost to the consumer of replenishing product while maintaining the same or an improved customer experience.

Such a replenishment mechanism would also enable the brand to launch a subscription service. In beauty today, we see "trial" subscription services where the consumer receives recurring shipments of mystery boxes with different product assortments. However, we do not see any companies that are successful in selling either single-brand or fixed-product subscriptions.

Another challenge in the beauty industry today is sustainability. The large amount of packaging used for beauty products is of increasing concern within today's political climate and among younger consumers.

What is needed is a product that can deliver an equally elevated consumer experience while requiring less packaging.

Finally, to achieve their desired transformation for various occasions, consumers use multiple liquid/gel beauty products at the same time. For example, they might use primer and foundation, foundation and concealer or two types of foundation. They might use both products at the same time in order to get results on different areas of their face, or they may use one product on some occasions and another product or combination of products in other cases. They likely use these products up at a difference cadence.

What is needed is (1) a way for the consumer to replenish products based on their individual needs and the cadence at which they use up each product and (2) the ability to carry a single product that can deliver the benefits of multiple products

SUMMARY OF THE INVENTION

The present invention is a product that supports ongoing replenishment. It makes it less expensive for a company to replenish the consumer's product and, therefore, it makes it less expensive for the consumer to continue buying the same product. This increases loyalty. The replenishment mechanism also has a lower environmental impact, resonating with consumer values. The replenishment experience is seamless and fun for the consumer. Finally, in some embodiments, the product contains multiple types of product within the same package. This means that consumers can carry a single product while still realizing the benefits of multiple product types.

In a first embodiment the present invention comprises an air-less cartridge dispensing system for dispensing a product, such as a fluid make-up product, by a manually operated pump. A cartridge carrier is disposed within a one or two-piece housing and holds an air-less cartridge. The carrier may be rotated, such as by 30 degrees, to disengage the carrier from a set of locking tabs, lugs, pins, or ramps to permit the carrier to be partially removed from the housing. A cartridge may then be removed and/or inserted into the carrier. After inserting the cartridge, the carrier may be reinserted into the housing and rotated, e.g., counter-rotated, to engage a set of locking tabs, lugs, pins, or ramps. When locked, a pump assembly at the top of the dispenser penetrates a seal on the cartridge to permit flow of a product from the cartridge through the pump assembly to be dispensed. The cartridge may be replaced when emptied or as desired by the user to permit dispensing of alternate product types. A replaceable or resealable cap may be used with the cartridge to re-seal the cartridge after a first-use or tamper seal has been breached by the pump assembly.

In another embodiment the physical product is a new type of case comprising one or two sides or chambers, where each chamber retains a cartridge of a specific type of product, such as a foundation. For example, in an embodiment where the case of the present invention comprises a single chamber product, the cartridge may contain a single type of foundation. In an embodiment where the present invention comprises a case capable of retaining two cartridges, or comprises two product chambers, one cartridge may hold a relatively lightweight foundation, and the other may hold a long-wear foundation. Alternatively, in the second example, one chamber may hold a primer and the other a moisturizer. On a day to day basis, the consumer may access a set of pumps, each pump operating one of the cartridges in the case, by lifting or removing a lid of the case and then pumping out either of the products in the cartridges from either side.

When the consumer uses up or depletes either type of product below a desirable level, the consumer can easily replace them. For example, the consumer may open or remove the bottom of the case, which may swing open on a hinge or be completely removable. The consumer then removes the used cartridge of product and replaces it with a new cartridge of the same or other type of product. The consumer then closes the case and proceeds to use the case as before. The process of replacing the cartridge provides an improved configuration that is mess-free and spill-proof. The design may leverage air-less technology which uses a vacuum to pump the product out of the cartridge through the pump without need for a tube. The cartridges in this manner provided added benefit as they are comprised of significantly thinner material than the exterior case and are therefore significantly less expensive to make and less expensive to ship. They also have a reduced environmental impact. To make it easy for the consumer to refill the product correctly—specifically to make sure they are replacing a used cartridge with the same type of product—the cartridges are designed with different patterns that are easily recognizable.

The present invention may be applied to a wide range of beauty products. The same air-less pump and replaceable cartridge technology can be applied to any liquid or gel beauty product.

The present invention also provides for a beauty subscription service that is the first of its kind. This subscription could be for any type of frequently replenished liquid or gel makeup or skincare. For example, for a subscription leveraging the dual-cartridge case of the present invention, the consumer would initially receive the exterior case and a set of cartridges, each with a different type of product. The consumer would then subscribe to receive regular deliveries of cartridges, which they would use to refill the exterior case. The cadence of the deliveries could be customized to the consumer's usage speed for both types of products. Due to the more limited packaging of the cartridges, the shipping costs would be relatively low compared to shipping a traditional product case. The reduced shipping costs plus the reduced packaging costs would enable this service and product to be provided to consumers at a lower cost relative to a subscription service using traditional product packaging. The consumer experience would remain elevated due to the ease and fun of replacing the product cartridges.

In one embodiment the present invention comprises a dual-cartridge case. In this embodiment, a cap of the case may be used to cover a set of air-less pumps. In this embodiment, the case is two-sided. Each side may hold an air-less cartridge comprising a different type of product. Each side of the case may have a separate air-less pump so that the consumer can pump out either type of product.

The bottom of the exterior of the case may be hinged. In one embodiment, the bottom remains securely in place during normal use but can easily be opened by the consumer in order to replace the cartridges. The two cartridges inside the case are independent, so the consumer can replace one while leaving the other. The consumer may remove a used cartridge through the bottom and then insert a new one to replace it. The cartridges may also be retained by other mechanisms including a push-push retention mechanism employing a tracked cam, an internal ledge operated by a release, or by a spring-operated piston ejector.

Each type of cartridge may have a different pattern so that it is easier for consumers to make sure that they are replacing a used cartridge with the correct type of new cartridge. The cartridges may also have the product type printed on the cartridge.

In a first embodiment the present invention provides a dispenser adapted to removably receive a replaceable cartridge and dispense a fluid cosmetic product contained in an installed cartridge, the dispenser comprising: a depressible pump head having an opening for dispensing cosmetic product; a pump housing adapted to support the depressible pump head and having a first connector portion configured to connect the pump housing with an air-less cartridge; a pump engine supported by the pump housing, operable by the depressible pump head, and having defined therein a fluid path adapted to be at least partially disposed within a connected air-less cartridge, the fluid path allowing flow of cosmetic product contained in the air-less cartridge to the depressible pump head opening; a retaining cover comprising a body having a pump opening and a first fixation portion; an air-less cartridge defining a cosmetic product reservoir, having a second connector portion adapted to matingly connect the air-less cartridge to the pump housing at the first connector portion, and having an opening through which the pump engine is at least partially received into the reservoir; a body having an opening at one end and defining an interior configured to receive the air-less cartridge, the body having a second fixation portion adapted to connect the body with the retaining cover at the first fixation portion to enclose the body interior with the air-less cartridge contained therein; whereby depressing the depressible pump head causes cosmetic fluid contained in the air-less cartridge reservoir to flow through the fluid path of the pump engine and through and out the opening in the pump head.

The first embodiment may be further characterized in one or more of the following manners: wherein the retaining cover first connector is threaded and the air-less cartridge second connector is a threaded neck, and the retaining cover and the air-less cartridge are secured together by threading and screwing the first and second connectors together; wherein the body first fixation portion is threaded and the retaining cover second fixation portion is threaded and the body and retaining cover are secured together by threading and screwing the first and second fixation portions together and whereby the first and second fixation portions may be unscrewed to disconnect the body from the retaining cover to permit removal of the air-less cartridge and insertion of a replacement air-less cartridge and re-connecting of the body with the retaining cover; wherein a pump sub-assembly comprises the depressible pump head, the pump housing, and the pump engine, and wherein the pump housing is formed integral to the retaining cover; wherein the air-less cartridge includes a piston and the body is cylindrical in shape with the piston disposed at an end of the reservoir opposite the pump engine; wherein the air-less cartridge piston is disposed opposite the air-less cartridge opening and includes a first surface in contact with the cosmetic fluid product contained in the reservoir and a second surface adjacent a void area formed in the air-less cartridge opposite the pump engine, whereby the piston moves toward the pump engine as the depressible pump head is depressed and cosmetic product is pumped out of the reservoir and the void grows as a function of the pump-action; wherein prior to installing the air-less cartridge in the dispenser body, the cartridge further comprises a cover portion adapted to fit over the opening in the cartridge to prevent spillage of the cosmetic product contained therein; wherein the uninstalled cartridge comprises a cap detachably affixed to the cartridge over the opening to protect the cover portion from damage; wherein the dispenser body is a cylindrical glass sleeve; further comprising a bottom cover attached to the dispenser body opposite the depressible pump head and made of a material other than glass for protecting the glass sleeve from accidental breakage; wherein the bottom cover comprises a shape corresponding to a curved bottom portion of the sleeve and is friction-fit over the curved bottom portion of the sleeve; wherein the air-less cartridge further comprises a piston disposed at least partially in the reservoir, a fluid cosmetic product disposed in the reservoir, and wherein upon operation of the depressible pump head the product in the reservoir is moved through the pump engine and out of the pump head, and the piston moves by an amount corresponding to a volume of the product dispensed; further comprising one or both of the following: a first mechanical feedback component disposed on the air-less cartridge and the retaining cover and configured to provide user feedback during cartridge installation to indicate proper installation of the air-less cartridge in the dispenser; a second mechanical feedback component disposed on the dispenser body and the retaining cover and configured to provide user feedback during connection of the retaining cover and the body.

In a second embodiment the present invention provides an air-less cartridge for use in a dispenser, the dispenser having a housing adapted to removably receive a cartridge and a pump adapted to dispense a fluid cosmetic product contained in an installed cartridge, the air-less cartridge comprising: a body having a top and a bottom and generally defining a cosmetic product reservoir therebetween and configured to be received within a dispenser shell, the top including an opening through which a portion of a dispenser pump is received into the reservoir and is in fluid contact with a fluid cosmetic product contained in the reservoir; a connector portion disposed at the top and adapted to matingly connect the air-less cartridge to the dispenser pump; a cover disposed over the opening and adapted to prevent spillage of fluid cosmetic product contained in the reservoir prior to installation of the cartridge in a dispenser, the cover being displaceable to permit a portion of the dispenser pump to be disposed within the reservoir upon installation of the cartridge in a dispenser; a piston disposed at the bottom and at least partially in the reservoir opposite the dispenser pump when the cartridge is installed in a dispenser; and a fluid cosmetic product disposed in the reservoir; wherein with the cartridge installed in a dispenser and upon operation of the dispenser pump, the fluid cosmetic product in the reservoir moves through the dispenser pump and out a dispenser opening and the piston moves by an amount corresponding to a volume of the product dispensed.

The second embodiment may be further characterized in one or more of the following manners: wherein the air-less cartridge connector portion is a threaded neck and the dispenser includes a retaining cover having an oppositely threaded connector, whereby the retaining cover and the air-less cartridge are secured together by threading and screwing the threaded neck and the oppositely threaded connector together; wherein the air-less cartridge piston is disposed opposite the air-less cartridge opening and includes a first surface in contact with the cosmetic fluid product contained in the reservoir and a second surface adjacent a void area formed at the bottom of the air-less cartridge opposite the dispenser pump, whereby upon operation of the pump the piston moves toward the top of the body as cosmetic product is pumped out of the reservoir and the void grows as a function of the pump-action; further comprising a cap detachably affixed to the cartridge over the opening to protect the cover from damage; and wherein the cover is adapted to allow piercing penetration of the dispenser pump portion installed into the reservoir and to provide a close-fit around the dispenser pump portion so that when the dispenser pump portion is removed from the reservoir the cover acts as a wiper to remove residual cosmetic product from the dispenser pump portion to provide a cleaner cartridge removal process.

In a third embodiment, the present invention provides a dispenser for dispensing a product from a cartridge, the dispenser comprising: a pump assembly; an upper retaining cover comprising a neck and a set of locking tracks; a lower retaining cover; a sleeve secured at a top end to the upper retaining cover, the sleeve comprising a locking tab and an alignment tab at a bottom of the sleeve; a cartridge carrier comprising: an upper collar comprising a set of locking pins and a set of alignment tabs; a body comprising a cartridge opening, a set of alignment edges, and a locking notch; and a bottom plate; wherein the cartridge carrier is adapted to be inserted into the sleeve such that the locking tab and the alignment tab of the sleeve align and guide the set of alignment edges of the body of the carrier as the carrier is moved upwards into the sleeve; wherein the locking tab of the sleeve moves correspondingly to the locking notch of the body of the carrier to guide the set of locking pins of the carrier into a locking engagement with the set of locking tracks of the upper retaining cover.

The dispenser of the above embodiment may further comprise, wherein the cartridge carrier is adapted to receive, secure, and position a cartridge in the cartridge opening. The cartridge carrier may be adapted to move the cartridge into an engaged position with the pump assembly such that a product in the cartridge may be dispensed by operation of the pump. The sleeve may be a glass sleeve. The sleeve may further comprise a cutout at the bottom to permit a cartridge to be fully inserted into the sleeve. The dispenser may further comprise, wherein: the sleeve further comprises an upper alignment notch; and the upper retaining cover further comprises an alignment tab corresponding to the upper alignment notch of the sleeve to permit proper alignment between the sleeve and the upper retaining cover. The neck of the upper retaining cover may be a threaded neck and corresponds to a threaded collar of the pump assembly such that the threaded collar of the pump assembly may be threaded onto the threaded neck.

In a fourth embodiment, the present invention provides a dispenser for dispensing a product from a cartridge, the dispenser comprising: a pump assembly; an upper retaining cover; a lower retaining cover; an inner sleeve comprising a neck, a set of locking tracks, a locking tab, and an alignment tab at a bottom of the inner sleeve, the inner sleeve secured at a top to the upper retaining cover; an outer sleeve corresponding to and disposed about the inner sleeve; a cartridge carrier comprising: an upper collar comprising a set of locking pins and a set of locking lugs; a body comprising a cartridge opening, a set of alignment edges, and a locking notch; and a bottom plate; wherein the cartridge carrier is adapted to be inserted into the inner sleeve such that the locking tab and the alignment tab of the inner sleeve align and guide the set of alignment edges of the body of the carrier as the carrier is moved upwards into the inner sleeve; wherein the locking tab of the inner sleeve moves correspondingly to the locking notch of the body of the carrier to guide the set of locking pins of the carrier into a locking engagement with the set of locking tracks of the inner sleeve.

The dispenser of the above embodiment may further comprise, wherein the cartridge carrier is adapted to receive, secure, and position a cartridge in the cartridge opening. The cartridge carrier may be adapted to move the cartridge into an engaged position with the pump assembly such that a product in the cartridge may be dispensed by operation of the pump. The inner sleeve may be a plastic sleeve and the outer sleeve may be a glass sleeve. The dispenser of the above embodiment may further comprise, wherein: the inner sleeve further comprises an upper alignment tab; and the upper retaining cover further comprises an alignment notch corresponding to the upper alignment tab of the inner sleeve to permit proper alignment between the inner sleeve and the upper retaining cover. The neck of the inner sleeve may be a threaded neck which corresponds to a threaded collar of the pump assembly such that the threaded collar of the pump assembly may be threaded onto the threaded neck. The neck of the inner sleeve may further comprise a locking collar adapted to secure the inner sleeve in a corresponding opening of the upper retaining cover. The set of locking lugs of the cartridge carrier may correspond to a set of recesses in the inner sleeve, and the set of locking lugs may be adapted to secure the cartridge carrier in a fully engaged or locked position to prevent undesired disengagement.

The present invention provides a dispenser for dispensing a product from a cartridge, the dispenser comprising: a pump assembly comprising a pump head, a pump housing having a threaded interior, and a pump engine; an upper retaining cover comprising a body having a pump opening and a threaded interior portion; an air-less cartridge comprising a threaded neck, wherein the threaded neck is correspondingly threaded to the threaded interior of the pump housing; a sleeve comprising an interior, a threaded upper portion, and a curved bottom portion, wherein the threaded upper portion of the sleeve is correspondingly threaded to the threaded interior portion of the body of the upper retaining cover; wherein when the threaded neck of the air-less cartridge is disposed within the pump opening of the upper retaining cover and fully threaded into the threaded interior of the pump assembly, each of the pump assembly, the upper retaining cover, and the air-less cartridge are secured together; wherein when the threaded upper portion of the sleeve is fully threaded into the threaded interior portion of the upper retaining cover, the air-less cartridge is positioned within the interior of the sleeve and is further secured and protected by the sleeve.

The sleeve of the dispenser of the above embodiment may be a glass sleeve. When the air-less cartridge is fully threaded onto the pump assembly, the pump engine is matingly engaged with the air-less cartridge and a product in the air-less cartridge is dispensable by user operation of the pump head. The dispenser may comprise a lower cover. The lower cover may further comprise a shape corresponding to the curved bottom portion of the sleeve and is friction-fit over the curved bottom portion of the sleeve. The air-less cartridge may further comprise an interior volume, a product disposed in the interior volume, and a piston. The pump assembly may be operated by a user the product in the interior volume is moved through the pump engine and out of the pump head, and the piston moved by an amount corresponding to a volume of the product dispensed.

BRIEF DESCRIPTION OF THE DRAWINGS

To facilitate a full understanding of the present invention, reference is now made to the accompanying drawings, in which like elements are referenced with like numerals. These drawings should not be construed as limiting the present invention but are intended to be exemplary and for reference.

FIGS. 10-16 and 16A provide various views of an exterior case having an integral spring retention mechanism for retaining a set of air-less cartridges according to an embodiment of the present invention.

DETAILED DESCRIPTION OF THE INVENTION

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

Figure 1:
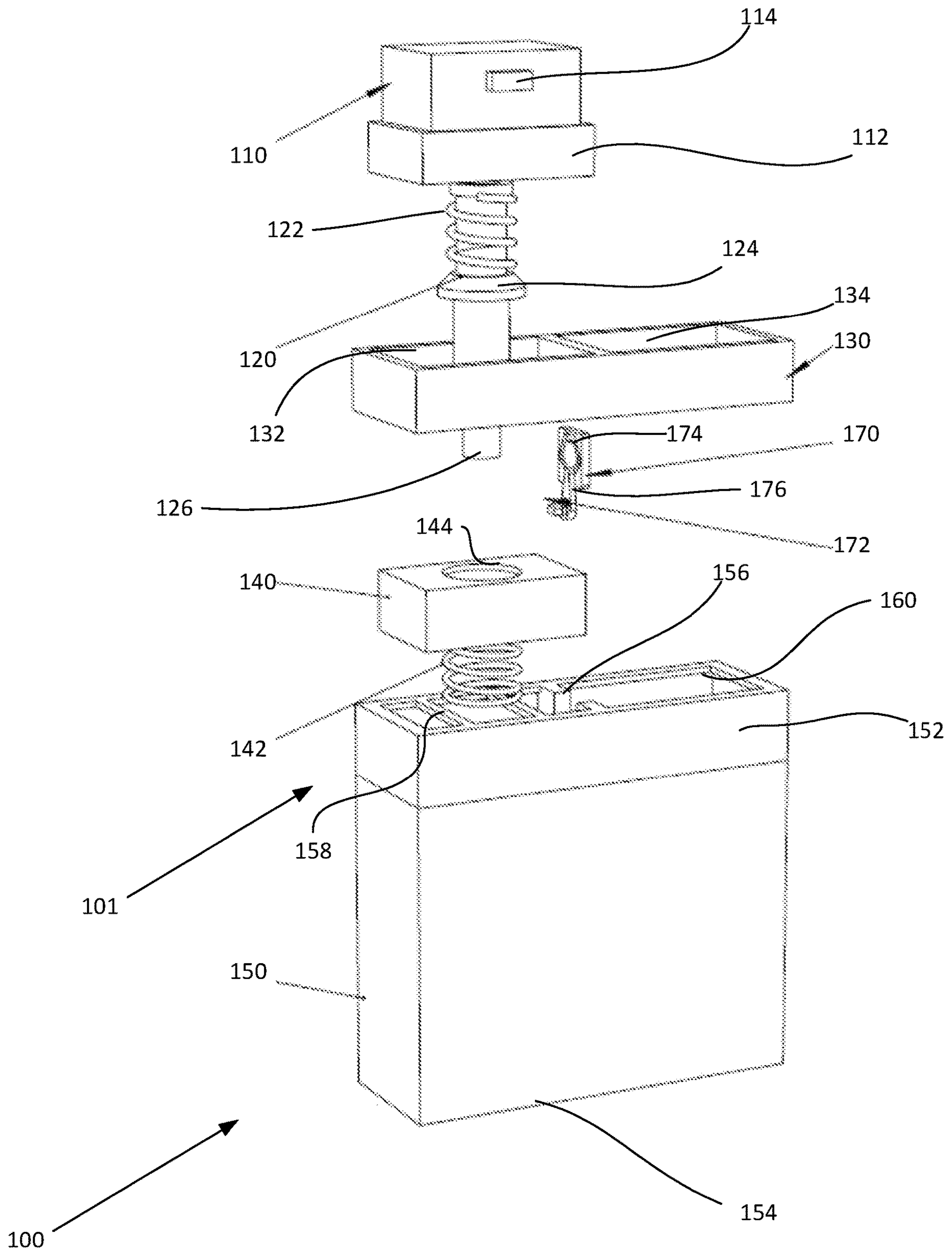
FIGS. 1-9 provide various views of an exterior case having a push-push cam-retention mechanism for retaining a set of air-less cartridges according to an embodiment of the present invention.
Figure 2:
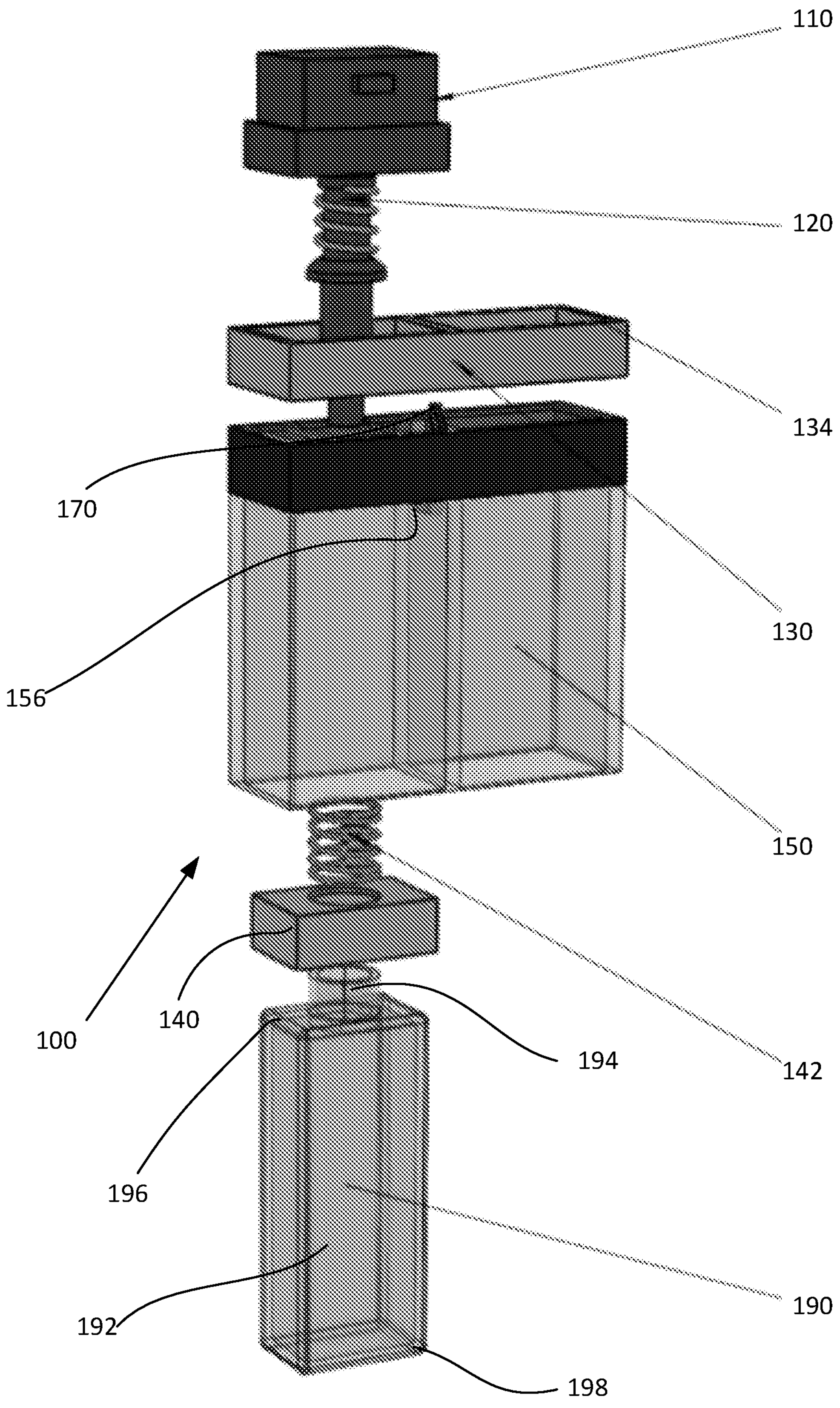
Figure 3:
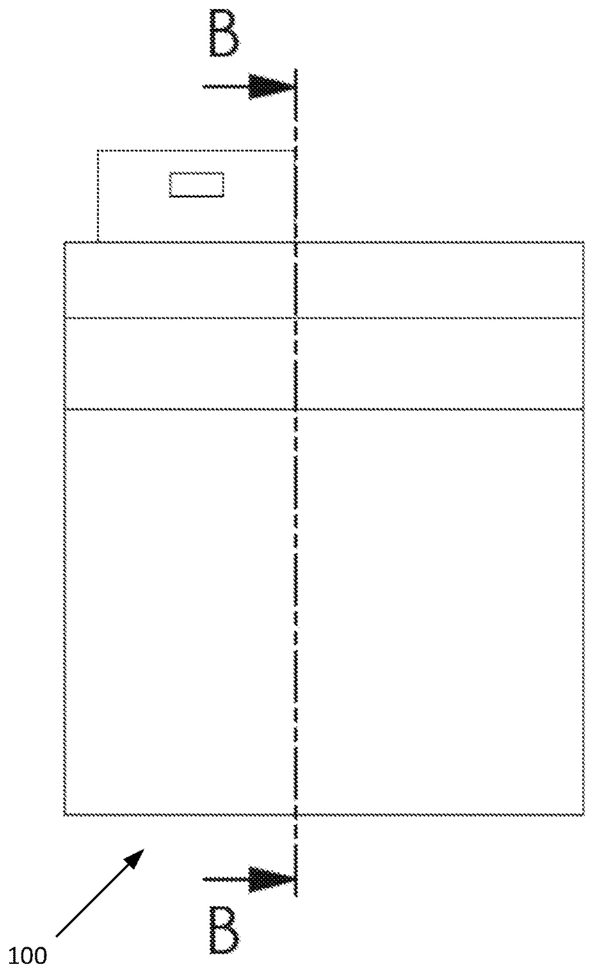
Figure 4:
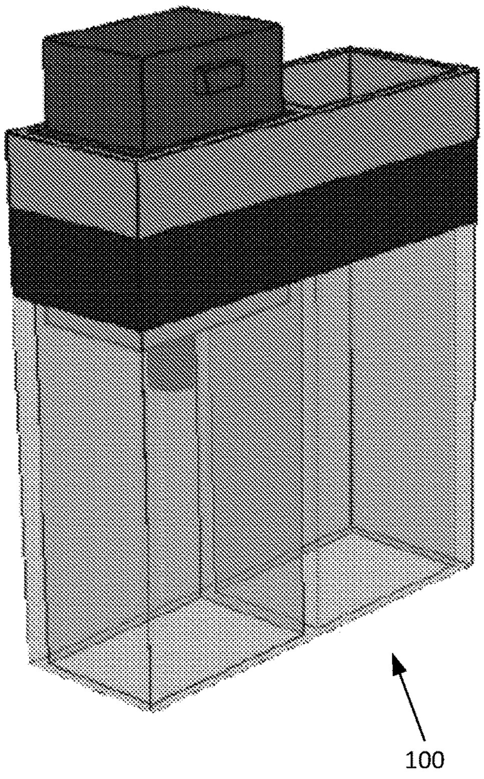

With reference now to FIGS. 1-9 various views of a dispensing system 100 comprising an exterior case 101 having a push-push cam-retention mechanism 170 for retaining a set of air-less cartridges 190 according to an embodiment of the present invention are provided. FIG. 1 provides an exploded view of the dispensing system 100. The dispensing system 100 comprises a case 101, dispenser 110, air-less pump 120, upper frame 130, cam sub-assembly 140, case frame 160, case 150, and cam-retention mechanism 170. The dispenser 110 comprises a spout or output 114 and a body or button 112. The air-less pump 120 operates by drawing a partial vacuum in a cartridge 190, shown in FIG. 2, and is operated by the button 112 of the dispenser 110. A pump spring 122 is disposed between the dispenser 110 and the flange 124 of the pump 120 and returns the dispenser 110 to a raised position after it is depressed by the user to dispense product in the cartridge 190. The upper frame 130 may comprise a first chamber 132 and a second chamber 134 to accommodate a first and second dispenser, pump, retention mechanism, and cartridge. The upper frame 130 may also retain the cam-retention mechanism 170 in the cam frame 156 in the case 150. The cam sub-assembly 140 comprises an opening 144 to permit the pump 120 to pass through and engage with the cartridge 190. In operation, the cam sub-assembly 140 would be disposed below the supports 158 in the interior of the case body 152 and case frame 160. The cartridge 190 interacts with the cam spring 142 to operate the cam arm 176 of the cam-retention mechanism 170.

Figure 5:
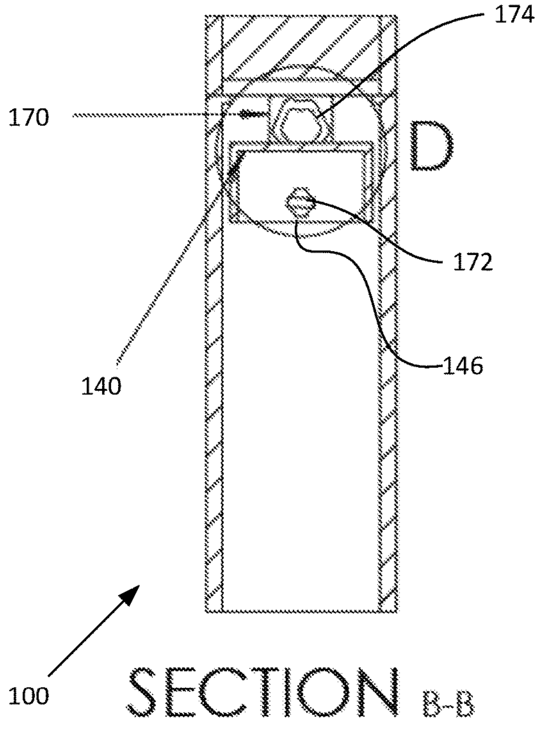
Figure 6:
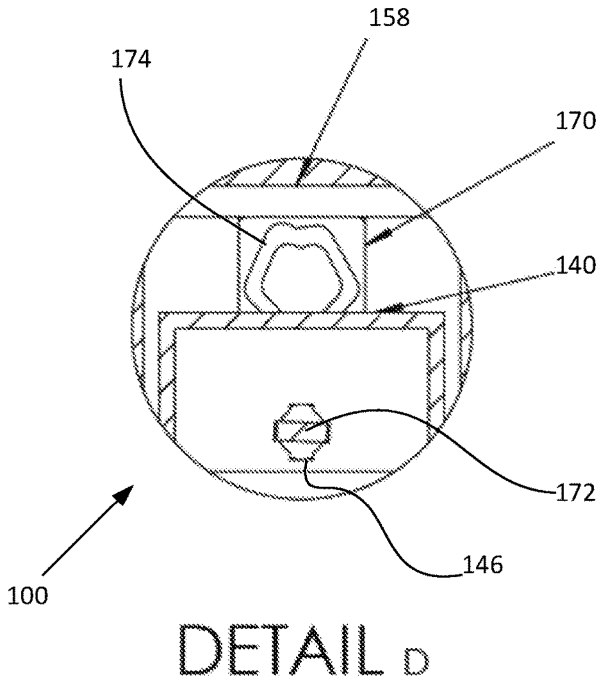
Figure 9:
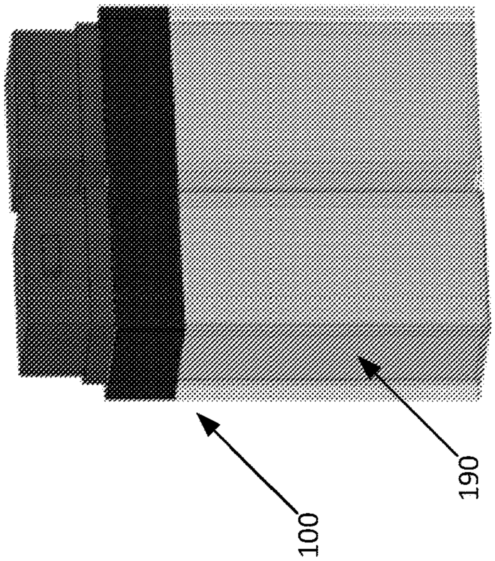
Figure 8:
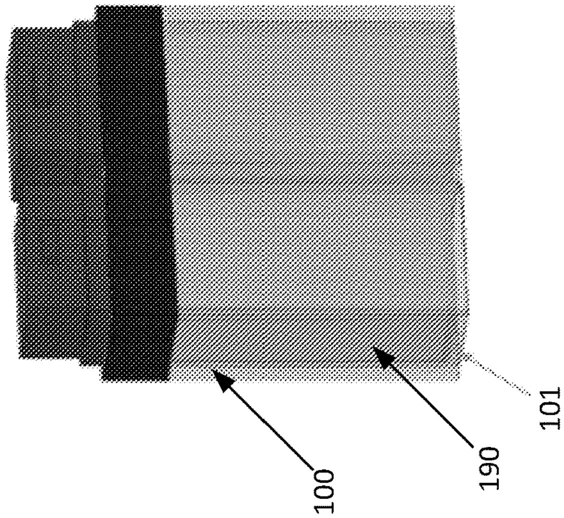
Figure 7:
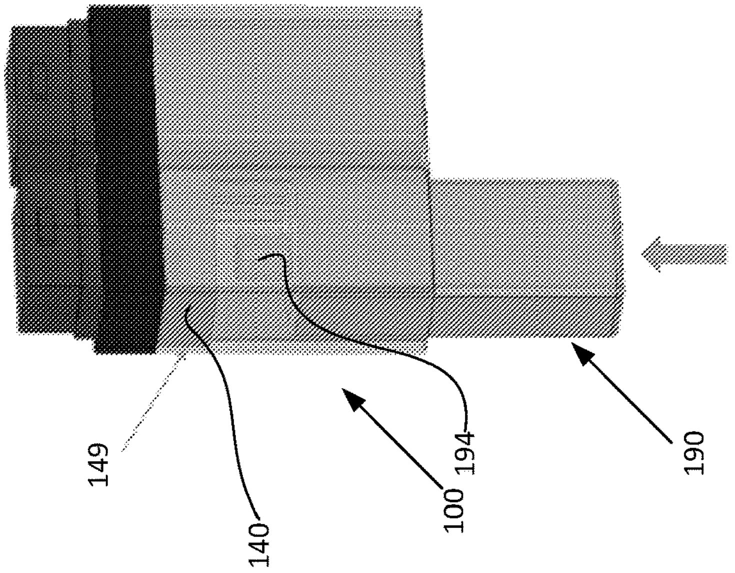

The operation of the cam-retention mechanism 170 is shown in detail in the cross-section B-B of FIG. 5 and detail section D of FIG. 6. As shown in FIGS. 2 and 5-9, the cartridge 190, which comprises an opening 194 at the top 196 and also comprises a body 192 and bottom 198, is inserted into the bottom 154 of the case 150. The top 196 of the cartridge 190 operates against the cam sub-assembly 140 and the bottom 126 of the pump 120 is inserted in the opening 194 of the cartridge 190. As the cartridge 190 is pushed upwards into the case 150, the cam sub-assembly 140 is correspondingly raised. This action rotates the cam arm 176 of the cam-retention mechanism 170 about the cam track 174, and the cam pin 172 rotates within the cam pin opening 146 of the cam sub-assembly 140. When the cam pin 172 rotates from a horizontal to a vertical position within the cam pin opening 146, the cam pin 172 locks the cartridge 190 in a retained or raised position. As shown in FIG. 8, the cartridge 190 is raised or inserted beyond a neutral or locked position 101 within the case 150. Spring pressure from the cam spring 142 keeps the cam sub-assembly 140 in the raised or locked position by keeping the cam pin 172 in a vertical orientation within the cam pin opening 146 and the cam arm 176 in a horizontal orientation until a user further presses the cartridge 190 into the case 150 in a second operation. By maintaining the cam sub-assembly 140 and cartridge 190 in a raised position, the cartridge is held in an operable position with the pump 120. Further operation of the cartridge 190 and cam sub-assembly 140 rotates the cam arm 176 about the cam track 174 to move the cam pin 172 into a horizontal orientation.

In the raised or locked position, the cam arm 176 is in a horizontal orientation and the cam pin 172 is in a vertical orientation, positioning the cam sub-assembly 140 closer to the supports 158 and engaging the cartridge 190 with the pump 120. In the lowered or unlocked position, the cam arm 176 is in a vertical orientation and the cam pin 172 is in a horizontal orientation, positioning the cam sub-assembly 140 further from the supports 158 and disengaging the cartridge 190 from the pump 120. When in the raised or locked position, the dispenser 110 may be used to operate the pump 120 to dispense product from the cartridge 190 until the product in the cartridge 190 is depleted. When the cartridge 190 is empty, it may be disengaged from the pump 120 and cam sub-assembly 140 by pressing the cartridge 190 inwards or up into the case 150. Once disengaged from the pump 120, the cartridge 190 may be removed from the case 150.

Typically, a user will insert the cartridge 190 until the user hears a small “click” sound from the cam pin 172 locking within the cam pin opening 146 of the cam sub-assembly 140. At that point the cartridge 190 is locked inside the case 150. To replace the cartridge 190, the user pushes the cartridge 190 and then the cartridge 190 is released from its lock and is able to be replaced. With the dispensing system 100, the pump 120 and cam sub-assembly 140 will be noticeable in the open position when no cartridge is inserted. Additionally, between replacement and when empty the air-less pump 120 may be noticeable by the user within the cartridge 190. The size of the case body 152 and case frame 160 may be adjusted to fully hide the pump 120 and cam sub-assembly 140 when no cartridge 190 is installed therein. A “puncher” may be used as part of the pump 120 or cam sub-assembly 140 to open a sealed cartridge 190 such that it may be engaged with the pump 120. A user may receive a sealed cartridge 190 and insert it into the case 150 while still sealed. The puncher then punctures the cartridge 190 to open it once it is inside of the case 150. This eliminates any mess and makes the process very easy for consumers.

Figure 10:
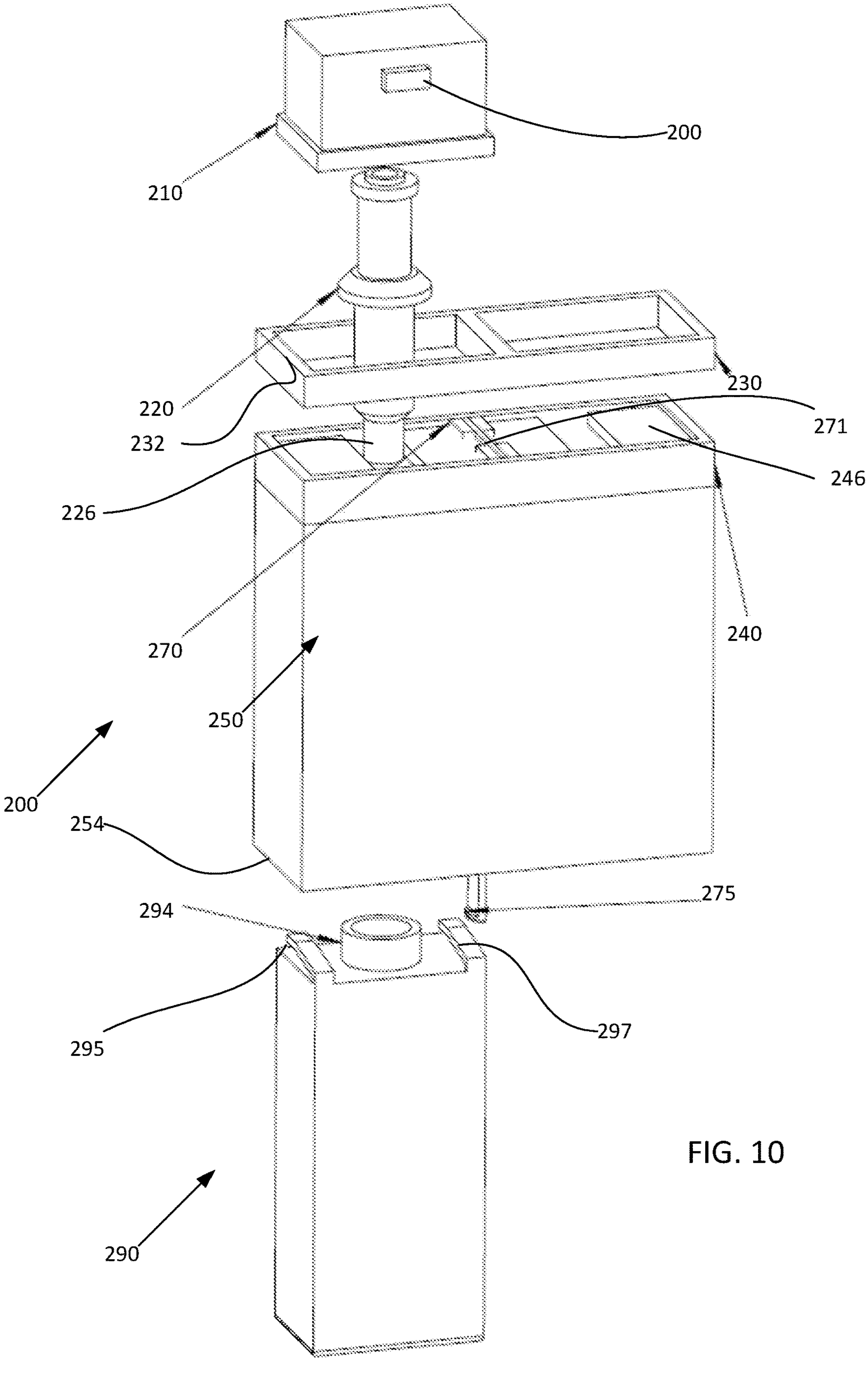
Figure 11:
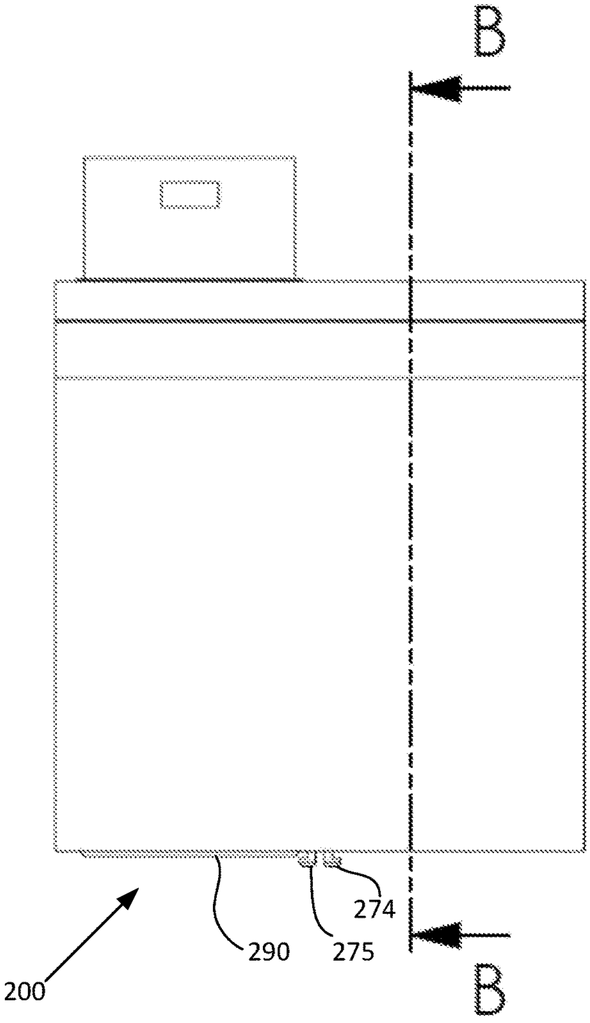
Figure 12:
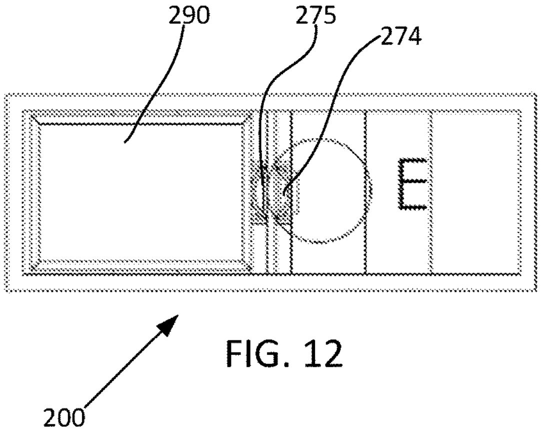

With reference now to FIGS. 10-16, various views of a dispensing system 200 comprising a case 250 having a release button locking and integral spring retention mechanism 270 for retaining a set of air-less cartridges 190 according to an embodiment of the present invention are provided. FIG. 10 provides an exploded view of the dispensing system 200. The dispensing system 200 is substantially similar to the dispensing system 100 shown in FIGS. 1-9, differing primarily in the manner in which the cartridge 290 is retained within the case 250. The dispensing system 200 comprises a dispenser 210 having an opening 200 through with product is dispensed, a pump 220 having a bottom 226, upper frame 230 with opening or home 232, case frame 240 with frame supports 246, case 520 with bottom 254, and integral spring retention mechanism 270.

Figure 13:
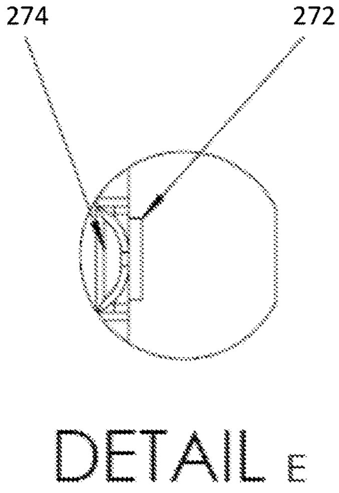
Figure 14:
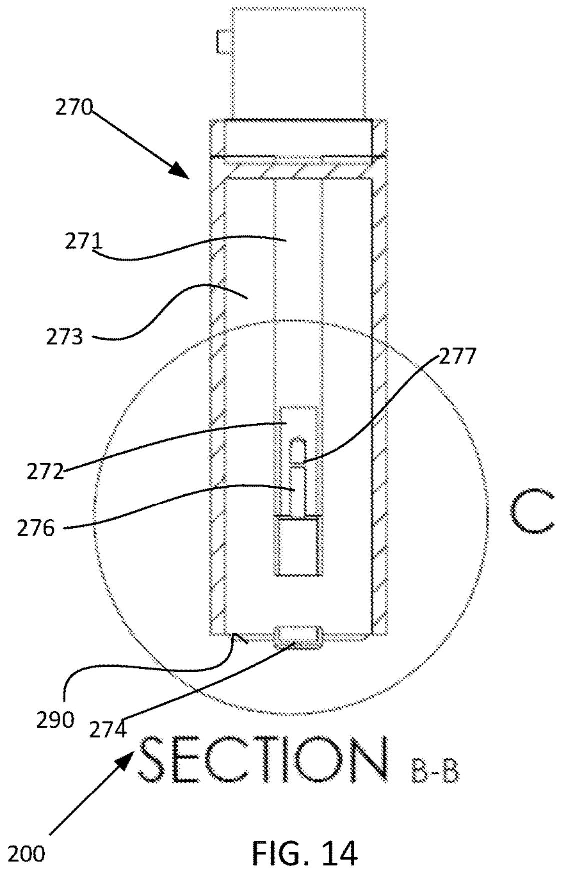
Figure 15:
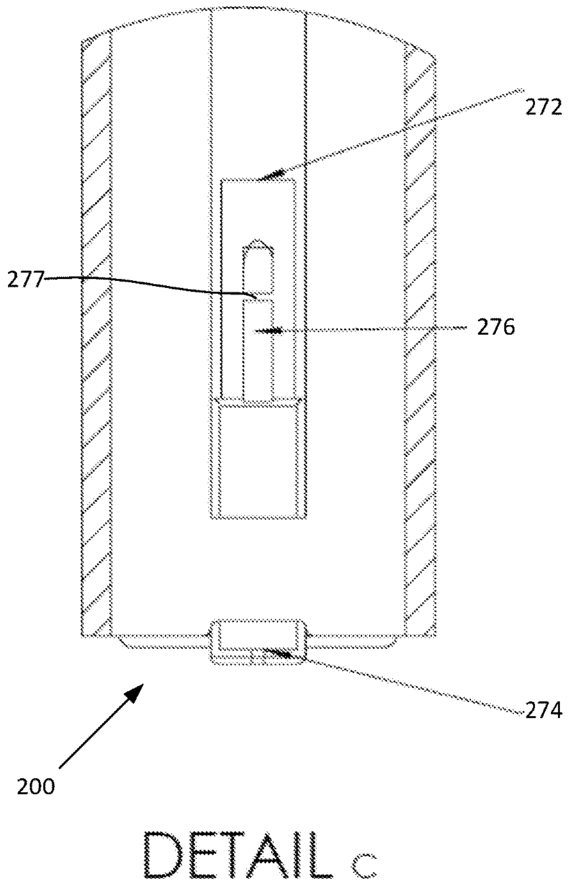
Figure 16:
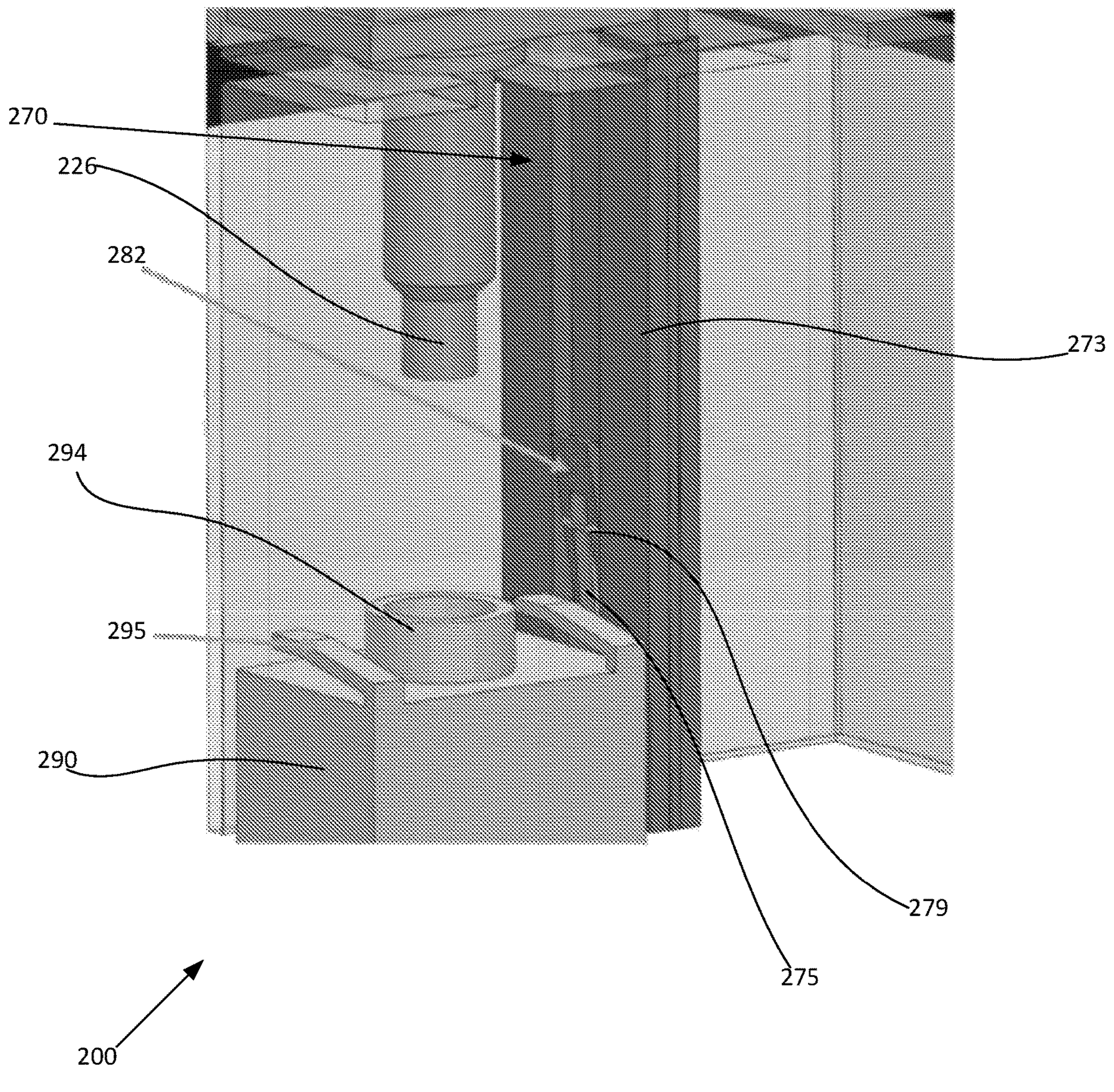
Figure 17:
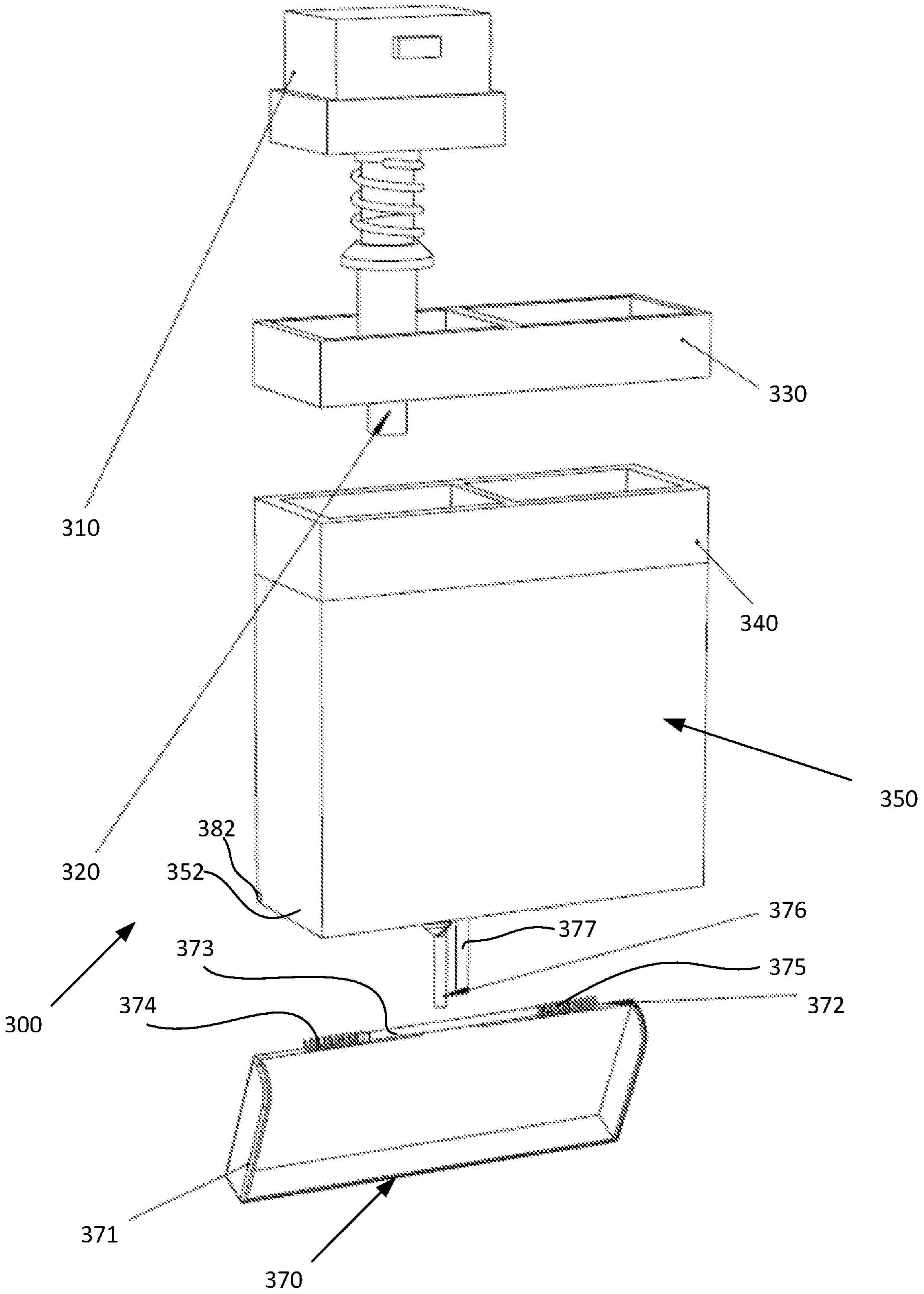
FIGS. 17-23 provide various views of an exterior case having a hinged bottom retention mechanism for retaining a set of air-less cartridges and a spring-operated piston ejection mechanism for ejecting the set of air-less cartridges according to an embodiment of the present invention.

As shown in the cross-section B-B of FIG. 14, detail section E of FIG. 13, detail section C of FIG. 15, and in FIG. 16 and in detail section A of FIG. 16A, a spring partition and guide 271 of retention partition and frame 273 in the case 250 retains releasing buttons 274 and 275 each having a corresponding locking ledge or snap 272 and 282. The releasing buttons 274 and 275 operate about respective pivots 277 and 279 to maintain the locking ledges 272 and 282 in an extended position, such that they protrude outwards into the interior of the case 150 from the frame 273. In this normally extended position, the locking ledges 272 and 282 may engage with a corresponding indentation in a cartridge 290 to lock the cartridge 290 within the case 250 when the cartridge 290 is fully inserted. User operation of the release buttons 274 or 275 will cause the release buttons to pivot about their respective pivots to move the locking ledge inwards, disengaging the locking ledge from the cartridge 290. Spring pressure from integral springs 295 and 297 of the cartridge 290 keep the cartridge 290 in a locked position and facilitate extraction of the cartridge when the corresponding release button is pressed. The opening 294 of the cartridge 290 engages with the bottom 226 of the pump 220 when the cartridge 290 is fully inserted in the case 250 and held in a locked position by a corresponding locking ledge 272 or 282 until released by user operation of a release button 274 or 275.

With this release button locking and integral spring retention mechanism 270 a user inserts the cartridge 290 until a snap is heard from the engagement of the locking ledge 272 or 282 that locks the cartridge 290 inside the case 250. In order to replace the cartridge 290 or remove the cartridge 290, the user pushes the release button 274 or 275 disposed at the bottom 254 part of the case 250 which releases the locking ledge 272 or 282 and corresponding cartridge 290.

With reference now to FIGS. 17-23 various views of a dispensing system 300 comprising an exterior case 350 having a hinged bottom retention mechanism 370 for retaining a set of air-less cartridges 390 and a spring-operated piston ejection mechanism 376 and 377 for ejecting the set of air-less cartridges 390 according to an embodiment of the present invention are provided. In the embodiment of the dispensing system 300 shown in the exploded view of FIG. 17, the dispensing system comprises a dispenser 310, pump 320, upper frame 330, case frame 340, case 350 having a bottom 352, and a hinged bottom retention mechanism 370 for retaining a set of air-less cartridges 390 and a spring-operated piston ejection mechanism 376 and 377 for ejecting the set of air-less cartridges 390.

Figure 18:
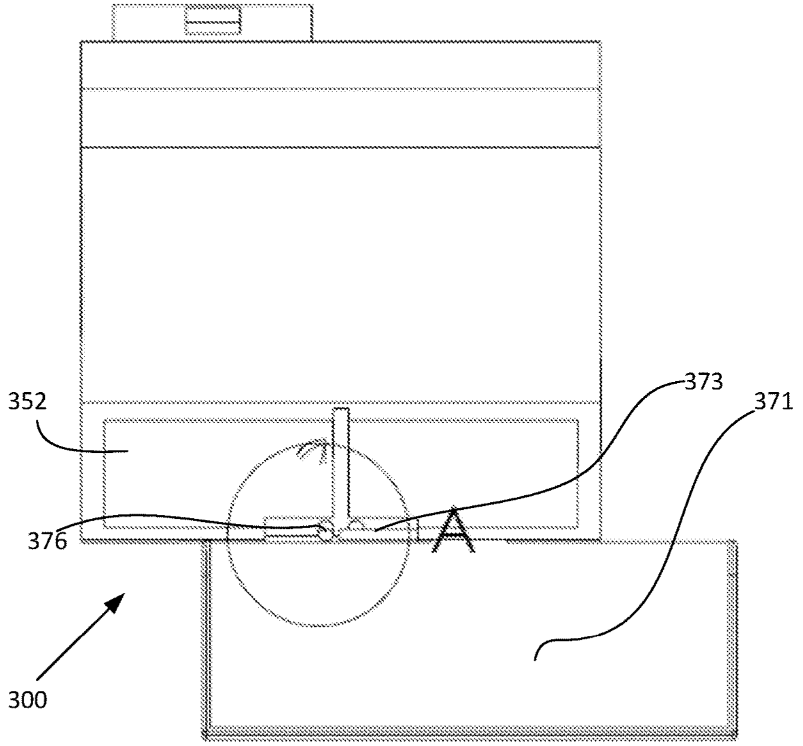
Figure 20:
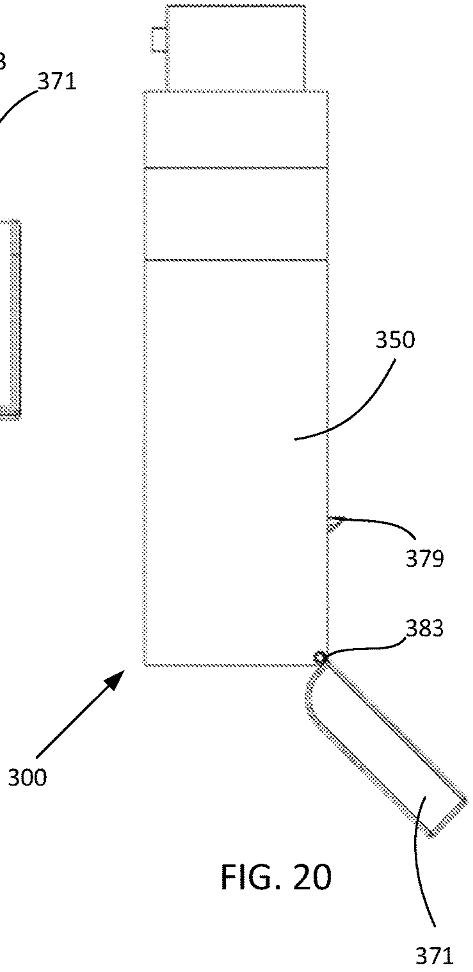
Figure 19:
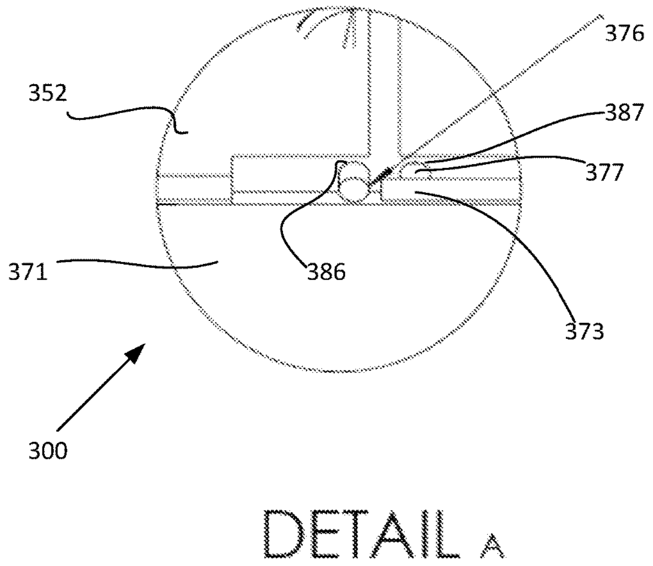
Figure 21:
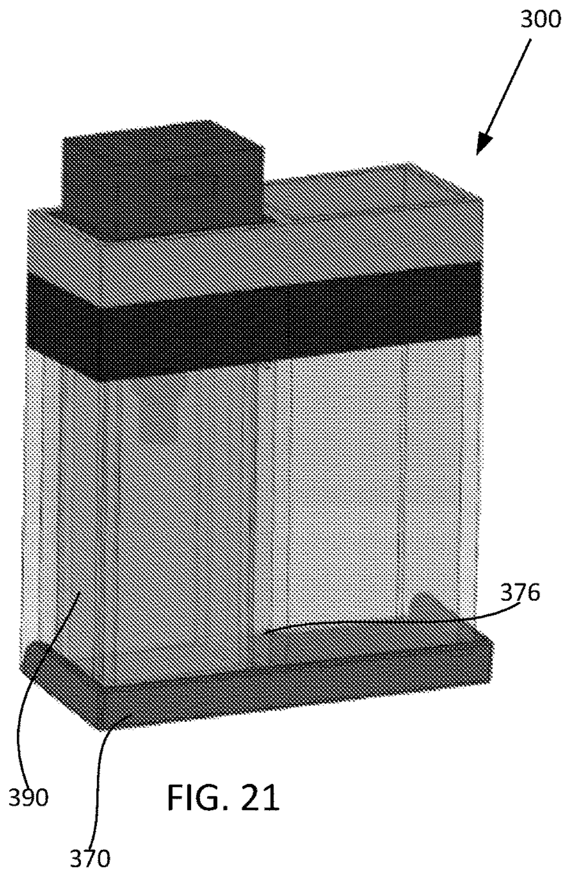
Figure 22:
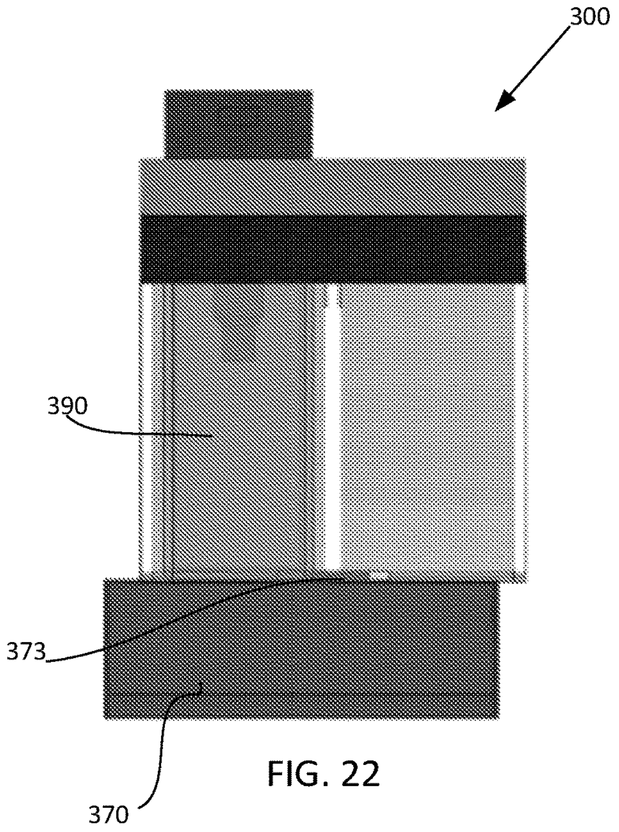
Figure 23:
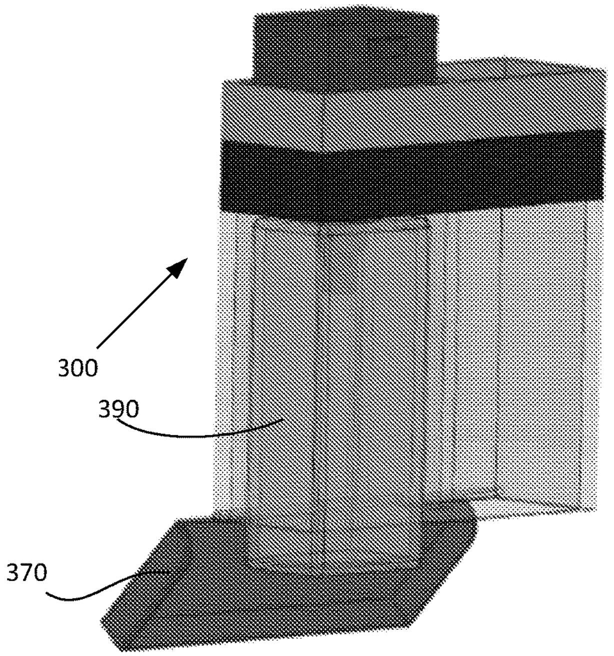

The hinged bottom cover 371 of the hinged bottom mechanism 370 pivots about posts 382 and 383, but may also be held in place and pivot about other suitable means such as a set of one or more pins or screws. The hinged bottom cover 371 may operate or slide from left to right and is held in and returned to a central or neutral position by springs 374 and 375. In a central position, the hinge 373 blocks the pistons 376 and 377, which are disposed in corresponding openings 386 and 387 in the case 350. When operated or moved by a user to a fully left (as shown in FIG. 22) or fully right (as shown in FIG. 18) position, the hinge 373 no longer blocks one or the other of the pistons 376 and 377. The pistons 376 and 377 may be spring operated or may be mechanically operated by a button or lever 379. The pistons 376 and 377 function to operate on a portion of a cartridge 390 to eject the cartridge 390 from the case 350 when the cartridge 390 is to be replaced.

The user inserts the cartridge 390 which is automatically locked when it reaches the top of the case 350 and engages with the pump 320. In order to release the cartridge 390 the user first opens the bottom cover 371 and cartridges stay at place. Upon pushing the cover 371 to its right or to its left the corresponding cartridge is released. When rotated open past a certain angle the bottom cover 371 can move to the left or right to eject a cartridge. When moving the cover 371 to the left side it extracts the left cartridge and when moving the cover 371 to the right side it extracts the right cartridge. The bottom cover 371 is normally operated to the center neutral position by the springs 374 and 375.

Figure 26:
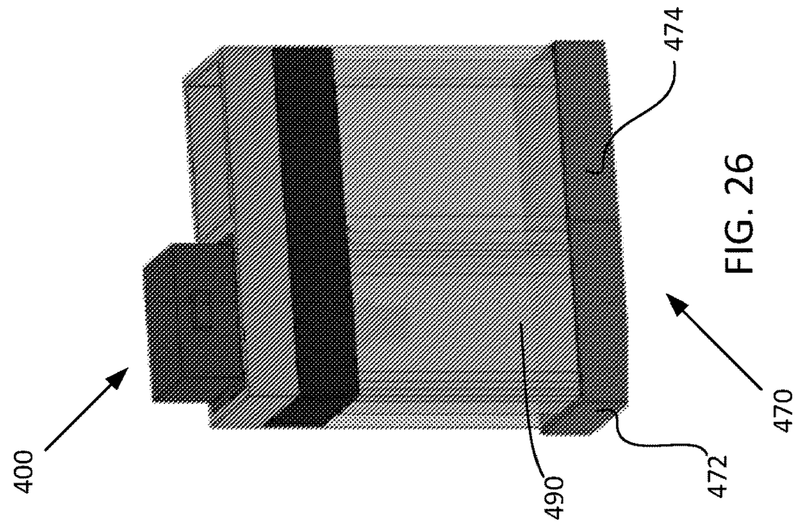
FIGS. 24-26 provide various views of an exterior case having a dual-hinged bottom retention mechanism for retaining a set of air-less cartridges according to an embodiment of the present invention.
Figure 25:
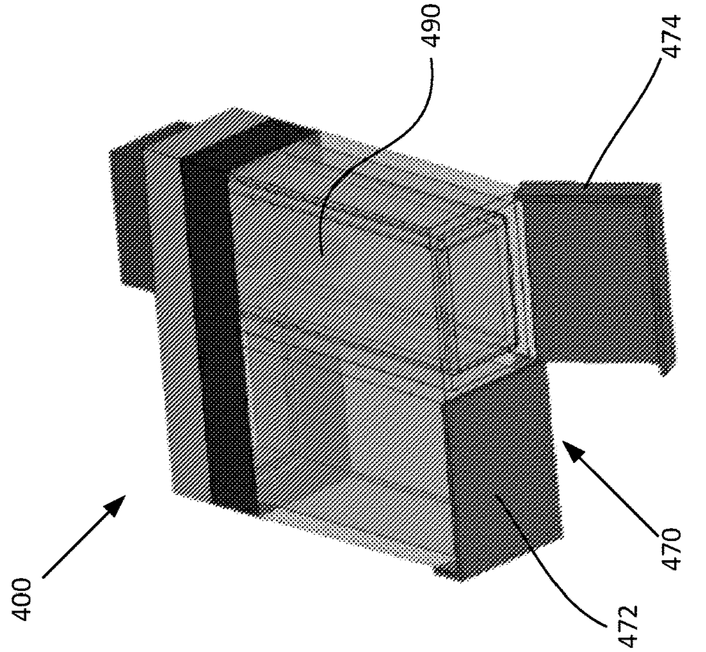
Figure 24:
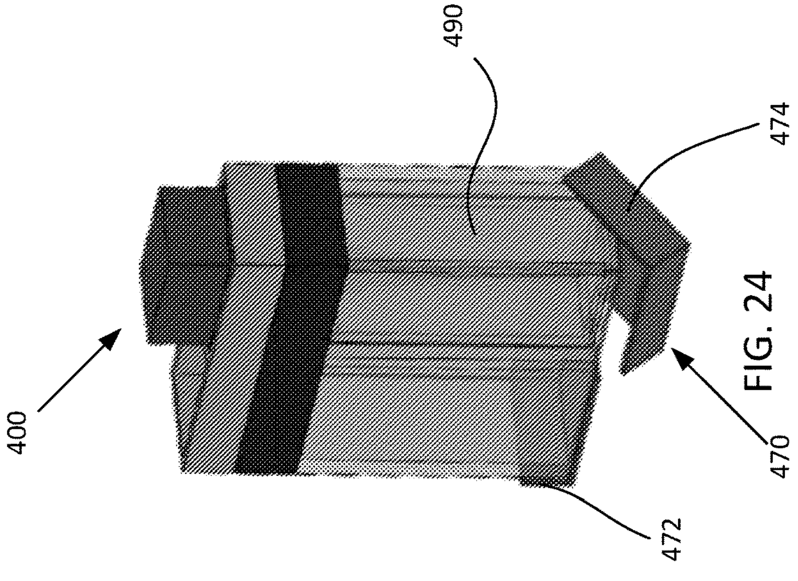

In another embodiment, as shown in FIGS. 24-26, various views of a dispensing system 400 having a dual-hinged bottom retention mechanism 470 for retaining a set of air-less cartridges 490 according to an embodiment of the present invention are provided. The dispensing system 400 shown in FIGS. 24-26 may be substantially similar to the system 300 shown in FIGS. 17-23 except that the retention mechanism 470 comprises a set of doors 472 and 474. The retention mechanism 470 may comprise pistons similar to the mechanism 370 shown with the dispensing system 300.

Figure 28:
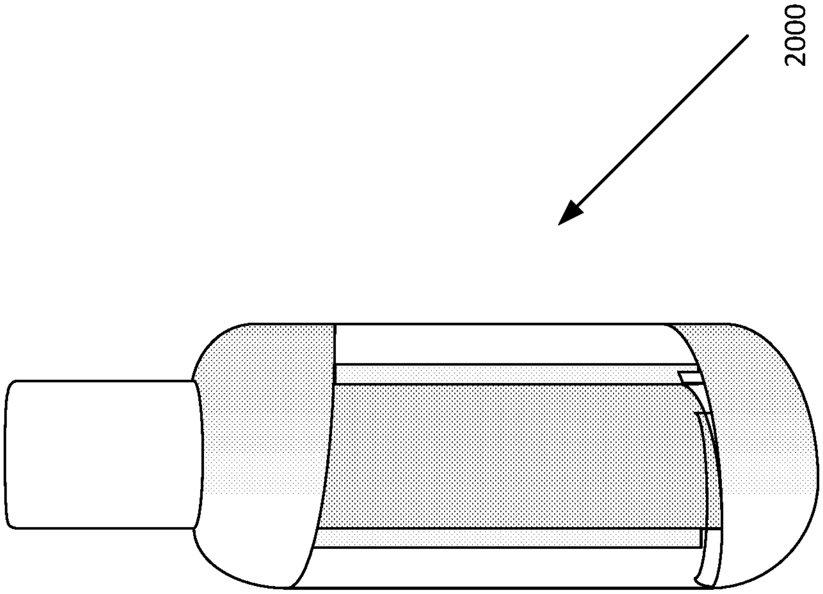
FIG. 28 provides a side view of an air-less cartridge dispensing system having a two-piece sleeve housing comprising an outer glass sleeve housing and an inner plastic housing according to an embodiment of the present invention.
Figure 27:
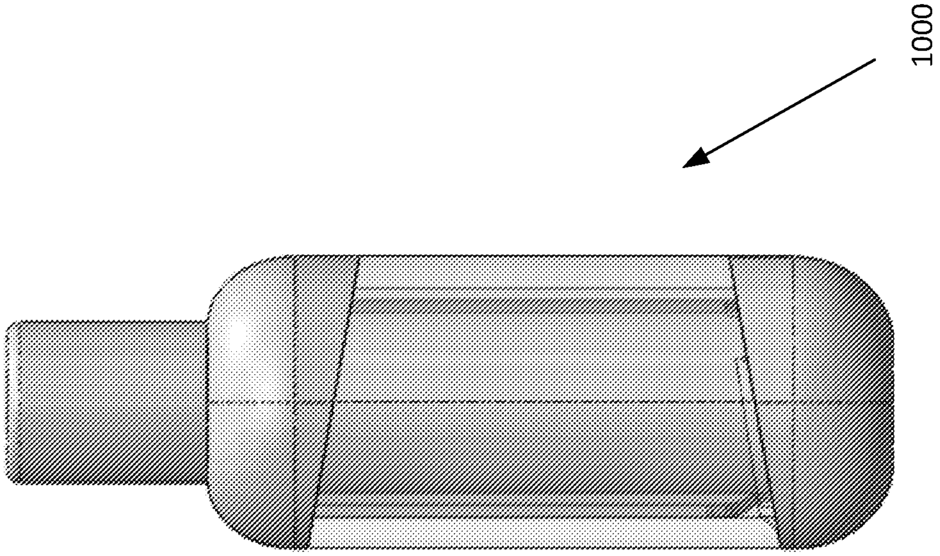
FIG. 27 provides a side view of an air-less cartridge dispensing system having a one-piece glass sleeve housing according to an embodiment of the present invention.
Figure 33:
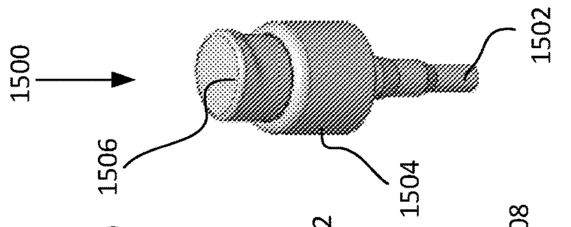
FIGS. 29-40 provide various perspective views of the components of an air-less cartridge dispensing system having a one-piece glass sleeve housing according to an embodiment of the present invention.
Figure 54:
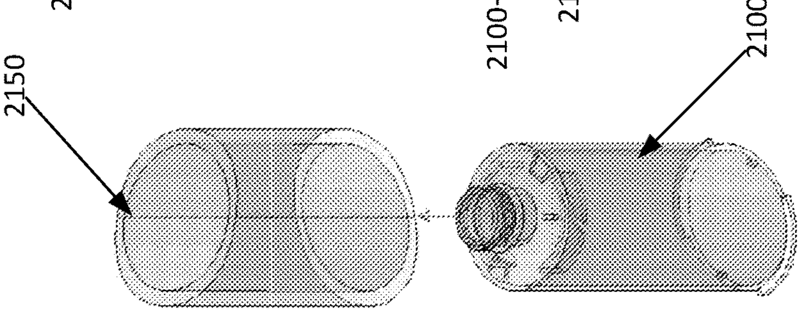

With reference now to FIG. 27, a side view of an air-less cartridge dispensing system 1000 having a one-piece glass sleeve housing according to an embodiment of the present invention is provided. Another embodiment, shown in FIG. 28 which provides a side view of an air-less cartridge dispensing system 2000, comprises a two-piece sleeve housing comprising an outer glass sleeve housing and an inner plastic housing. Both the dispensing systems 1000 and 2000 accept a removable, replaceable, air-less cartridge, such as the cartridge 3000 shown in FIG. 54, and dispense a fluid, such as make-up, by manual operation of a pump of the dispensing system.

With reference now to FIGS. 29-40, various perspective views of the components of the air-less cartridge dispensing system 1000 having a one-piece glass sleeve housing are provided. The dispensing system 1000 comprises a glass sleeve 1100, upper retaining cover 1200, lower retaining cover 1300, cartridge carrier 1400, and pump assembly 1500. As shown in FIGS. 37-40 the upper retaining cover fits on top of the glass sleeve 1100 and may be secured by locking or friction fit tabs, or by an adhesive. Pump assembly 1500 screws onto the upper retaining cover 1200. The cartridge carrier 1400 clips into or is secured by an adhesive into the lower retaining cover 1300 and is inserted into the glass sleeve 1100 where it is locked in place.

Returning to FIG. 29, the glass sleeve 1100 comprises a body 1102, interior 1104, top lip 1106, bottom 1108, alignment notch 1110, locking tab 1112, alignment tab 1114, and clearance cutout 1116. The glass sleeve 1100 may be extruded glass, acrylic, or any other suitable material. The upper retaining cover 1200, shown in FIG. 30, comprises a body 1202 and a threaded opening 1204. The upper retaining cover 1200 may be plastic, metal, or any other suitable material. The lower retaining cover 1300, shown in FIG. 31, comprises a body 1302, interior 1304, and upper lip 1306. The lower retaining cover 1300 may be plastic, metal, or any other suitable material. The pump assembly 1500, shown in FIG. 33, comprises a pump 1502, threaded collar 1504, and dispenser 1506. The pump assembly may be any suitable pump assembly for dispensing a fluid from a sealed, air-less cartridge. The tip of the pump 1502 may be used to penetrate a seal or open an air-less cartridge to permit a fluid therein to be pumped and dispensed by operation of the pump assembly 1500.

Figure 32:
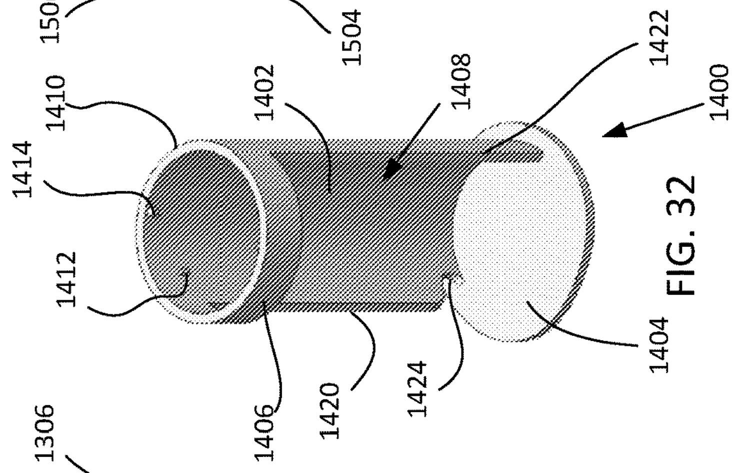
Figure 31:
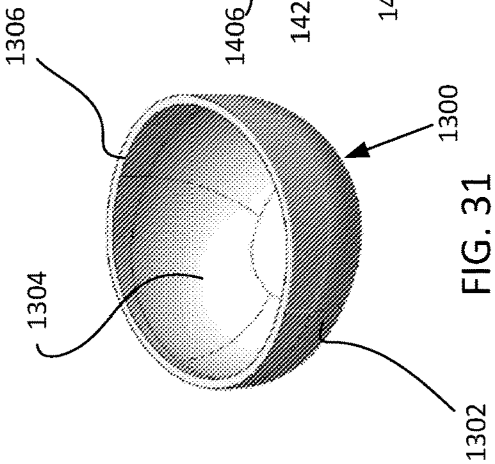
Figure 30:
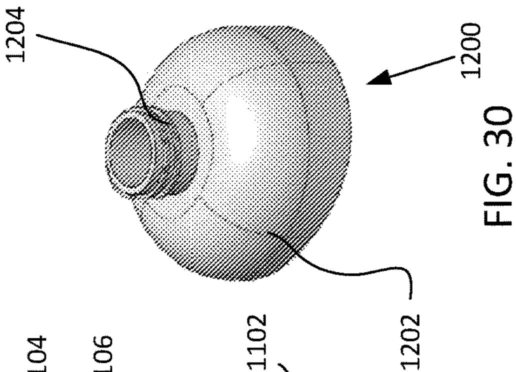
Figure 29:
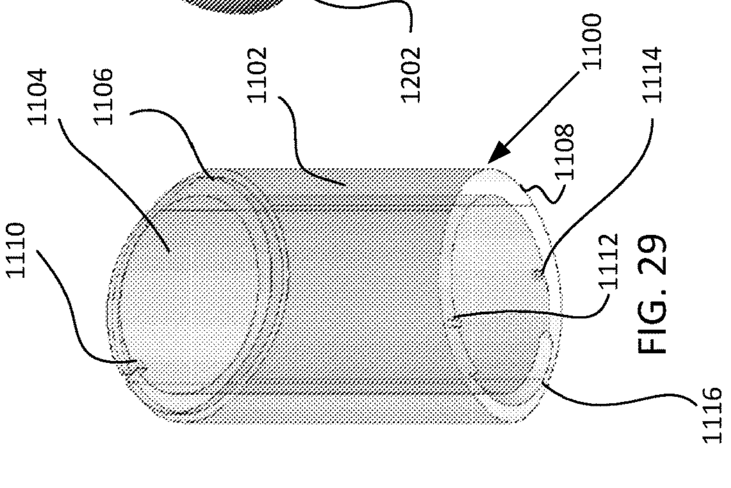

The cartridge carrier 1400, shown in FIG. 32, comprises a body 1402, bottom plate 1404, upper collar 1406, cartridge receiving space or opening 1408, top 1410, cartridge alignment tabs 1412, locking pins or tabs 1414, alignment edges 1420 and 1422, and locking notch 1424. The cartridge carrier 1400 may be plastic, metal, or any other suitable material. In operation, the cartridge carrier 1400 holds or retains a cartridge in the space 1408 and positions the cartridge such that when the carrier 1400 is fully inserted into the sleeve 1100 the pump assembly 1500 engages with the cartridge such that a pumping operation of the pump assembly 1500 dispenses a fluid from the cartridge.

Figure 34:
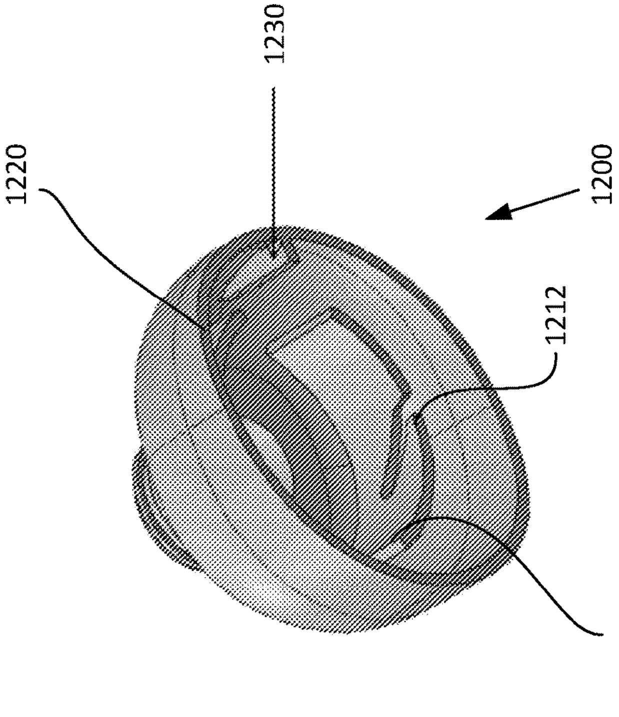

With reference now to FIG. 34, a bottom perspective view of the upper retaining cover 1200 is provided. An alignment tab 1230 corresponds to the notch 1110 of the sleeve 1100 aligns the upper retaining cover 1200 with the sleeve 1100 when mated to the sleeve 1100. A set of tabs 1210 and 1220 each comprise a cam track or locking track such as the track 1212. These tracks correspond to the locking pins 1414 of the cartridge carrier 1400. When inserted, the pins 1414 of the cartridge carrier 1400 fit into and follow the tracks 1212 until the cartridge carrier 1400 is fully inserted and locked in place.

Figure 35:
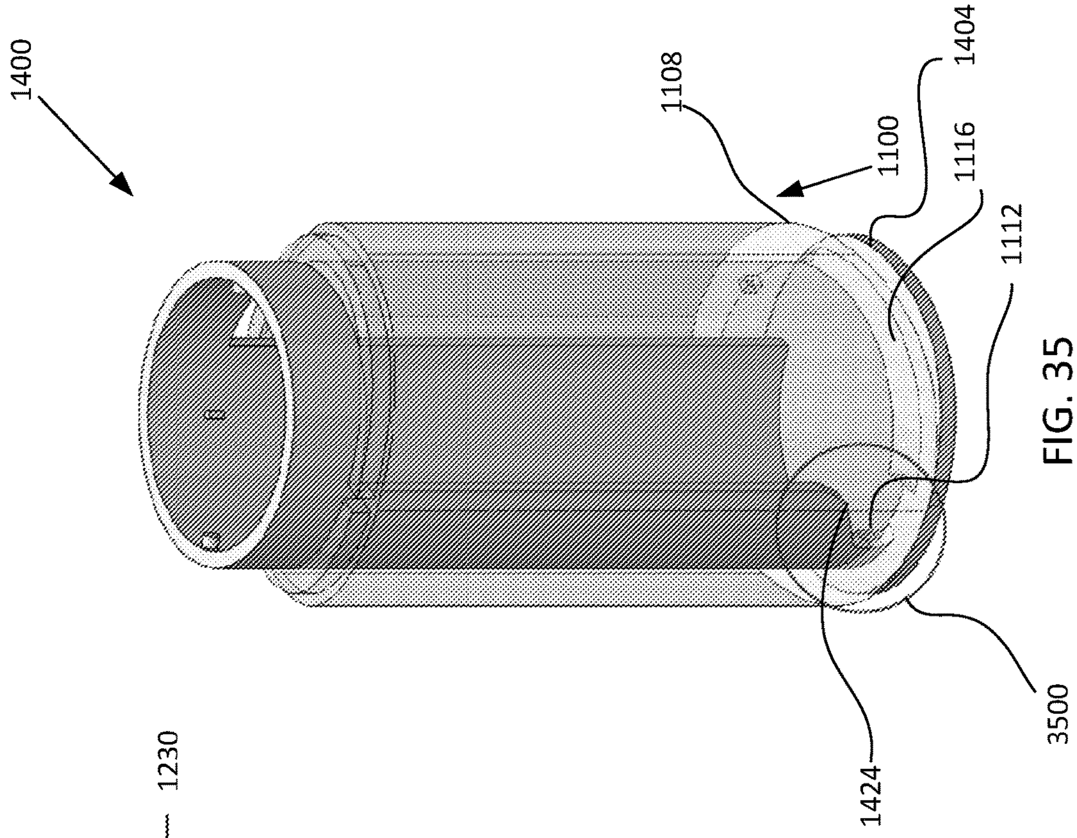
Figure 36:
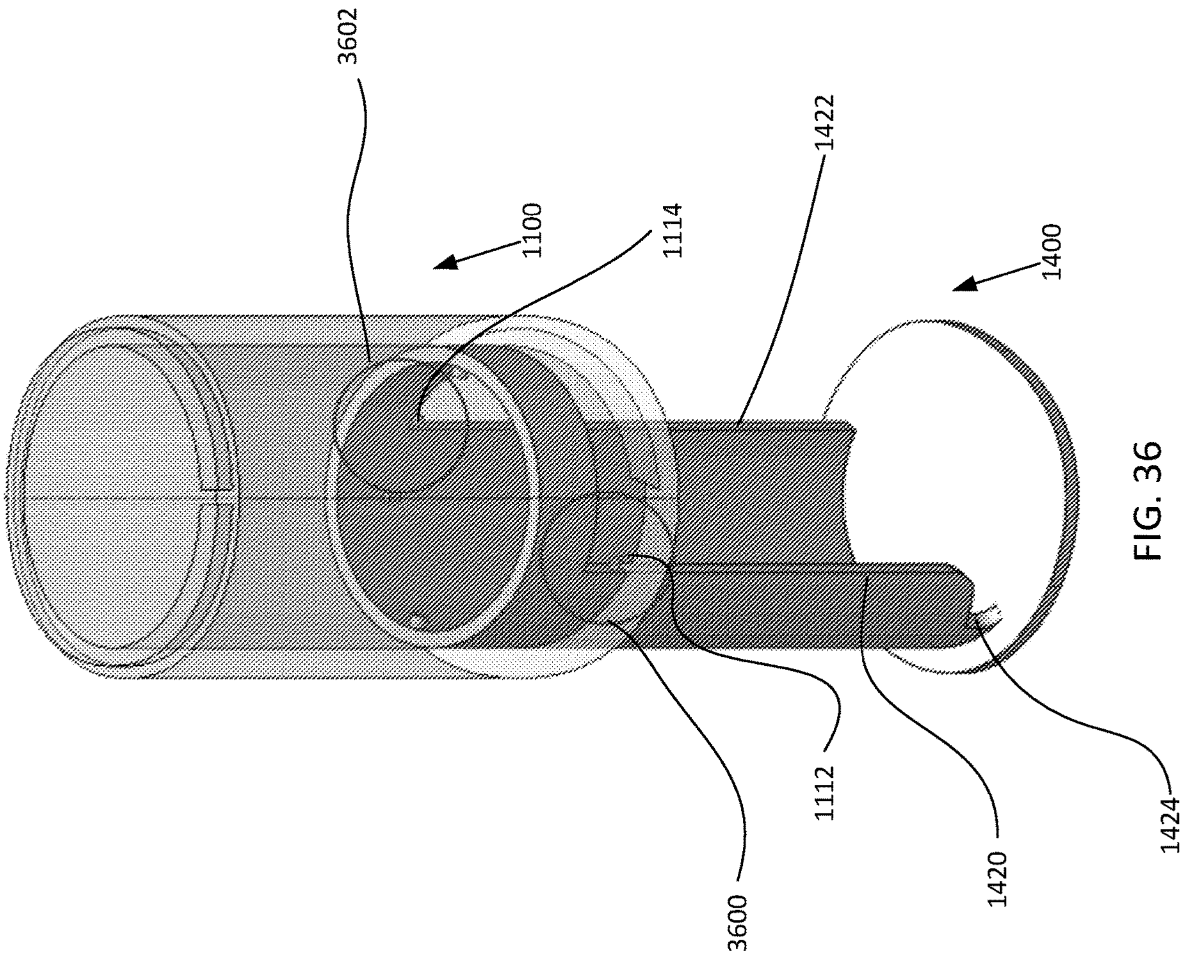
Figure 40:
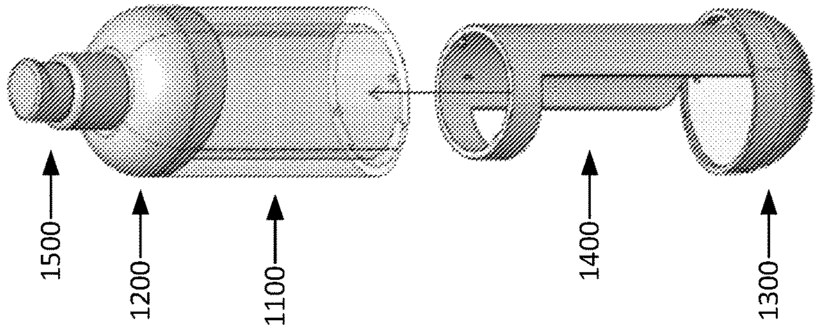
Figure 39:
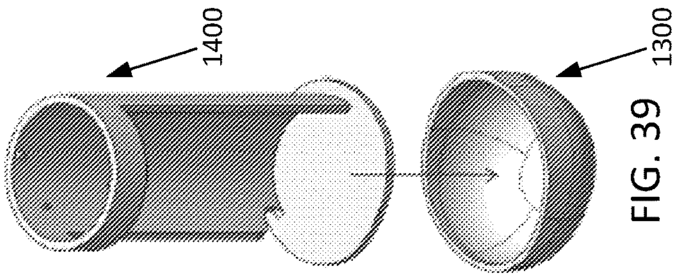
Figure 38:
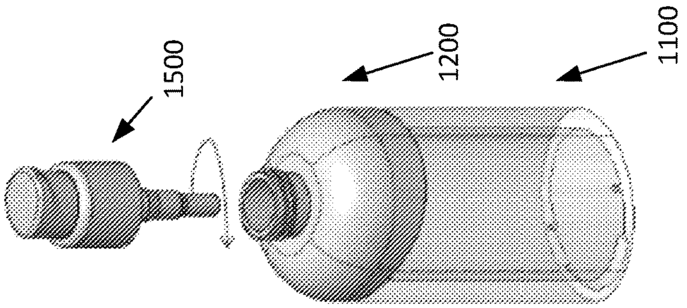
Figure 37:
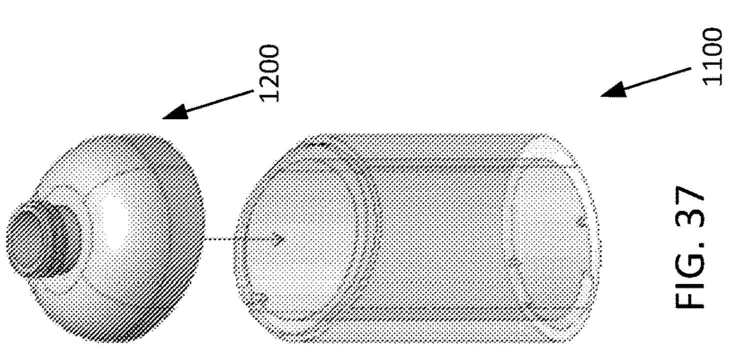
Figure 46:
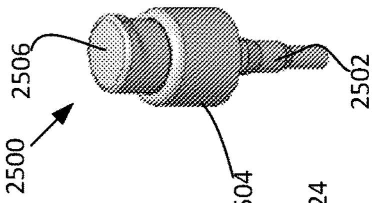
FIGS. 41-58 provide various perspective views of the components of an air-less cartridge dispensing system having a two-piece sleeve housing comprising an outer glass sleeve housing and an inner plastic housing according to an embodiment of the present invention.

FIG. 35 illustrates the cartridge carrier 1400 fully inserted into the glass sleeve 1100. The bottom plate 1404 on which a cartridge would rest is abutting the bottom 1108 of the sleeve 1100. A cutout 1116 in the sleeve 1100 permits the cartridge to be fully inserted when the carrier 1400 is in the sleeve 1100 without interference. As shown in the area 3500, the tab 1112 would follow and abut the notch 1424 when the carrier 1400 is fully inserted and rotated into position. FIG. 36 illustrates the carrier 1400 partially removed from the sleeve 1100. In the area 3600 the locking tab 1112 abuts the alignment edge 1420 of the carrier 1400 and in the area 3602 the alignment edge 1422 abuts the alignment tab 1114. The tabs 1112 and 1114 follow and guide the respective edges 1420 and 1422 until the carrier 1400 is fully inserted into the sleeve 1100. When fully inserted into the sleeve 1100, the carrier 1400 may be partially rotated with the locking tab 1112 following the corresponding shape of the notch 1424 until the carrier is fully locked in place in the upper retaining cover 1200.

With reference now to FIGS. 41-58, various perspective views of the components of an air-less cartridge dispensing system 2000 having a two-piece sleeve housing comprising an outer glass sleeve housing and an inner plastic housing are provided.

In contrast to the single sleeve dispensing system 1000, the dispensing system 2000 shown in FIGS. 41-58 comprises a two-piece sleeve construction with an inner plastic sleeve 2100, an outer glass sleeve 2150, and further comprises upper retaining cover 2200, lower retaining cover 2300, cartridge carrier 2400, and pump assembly 2500. As shown in FIGS. 54-58 the inner plastic sleeve 2100 fits within the outer glass sleeve 2150 and is secured by an adhesive or by a friction fit. The upper retaining cover 2200 fits on top of the inner plastic sleeve 2100 and outer glass sleeve 2150 and may be secured by locking or friction fit tabs, or by an adhesive. Pump assembly 2500 screws onto the inner plastic sleeve 2100 and extends into the interior of the inner plastic sleeve 2100 such that it may operatively engage with a cartridge to permit a product or fluid to be pumped through and dispensed by the pump assembly. The cartridge carrier 2400 clips into or is secured by an adhesive into the lower retaining cover 2300 and is inserted into the inner plastic sleeve 2100 where it is locked in place.

Returning to FIG. 41, the inner plastic sleeve 2100 comprises a body 2102, top 2140, bottom 2106, threaded neck 2108, neck locking collar 2110, and a set of tabs 2112 and 2114 which each comprise a cam track or locking track such as the track 2116. These tracks correspond to the locking pins 2410 of the cartridge carrier 2400. The inner plastic sleeve 2100 further comprises a set of bottom lips 2122 and 2124, a locking tab 2126, and an alignment tab 2128. The inner plastic sleeve 2100 may be made from plastic, acrylic, or any other suitable material.

Figure 42:
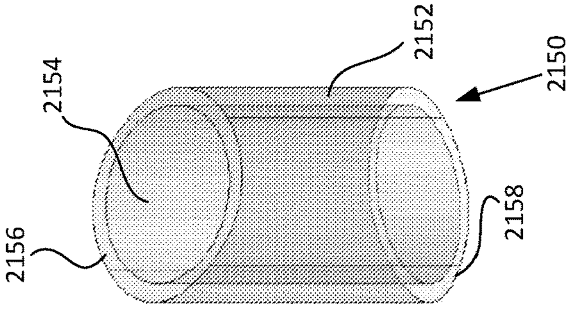
Figure 41:
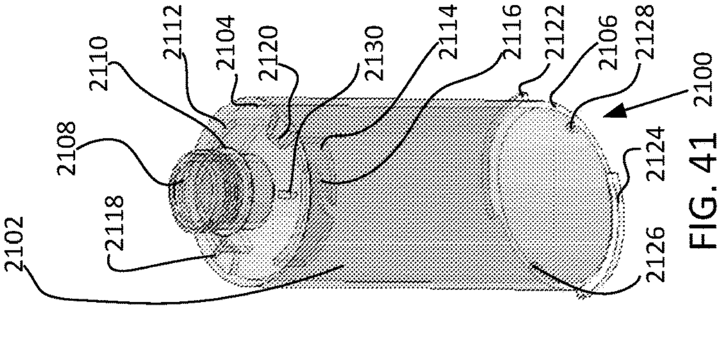

With reference to FIG. 42, the glass sleeve 2150 comprises a body 2152, interior 2154, top lip 2156, and bottom 2158. The glass sleeve 2150 may be extruded glass, acrylic, or any other suitable material. The upper retaining cover 2200, shown in FIG. 43, comprises a body 2202 and an opening 2204. The upper retaining cover 2200 may be plastic, metal, or any other suitable material. The lower retaining cover 2300, shown in FIG. 44, comprises a body 2302, interior 2304, and upper lip 2306. The lower retaining cover 2300 may be plastic, metal, or any other suitable material. The pump assembly 2500, shown in FIG. 46, comprises a pump 2502, threaded collar 2504, and dispenser 2506. The pump assembly 2500 may be any suitable pump assembly for dispensing a fluid from a sealed, air-less cartridge. The tip of the pump 2502 may be used to penetrate a seal or open an air-less cartridge to permit a fluid therein to be pumped and dispensed by operation of the pump assembly 2500.

Figure 45:
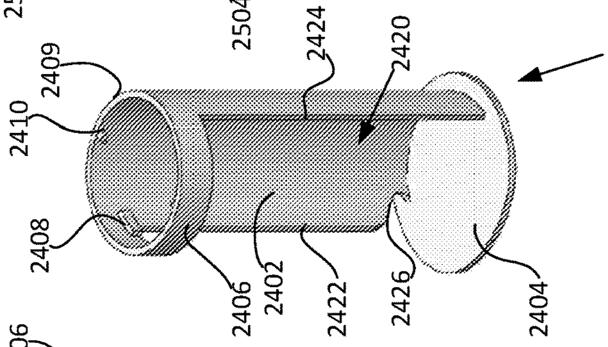
Figure 44:
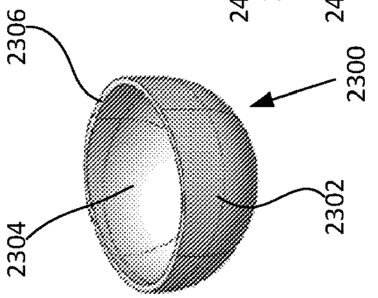
Figure 43:
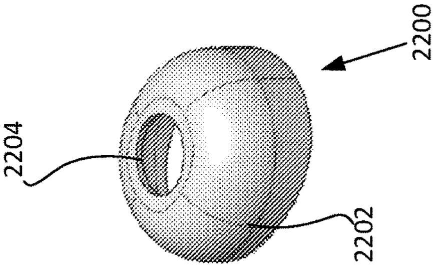

The cartridge carrier 2400, shown in FIG. 45, comprises a body 2402, bottom plate 2404, upper collar 2406, cartridge receiving space or opening 2420, top 2409, cartridge alignment tabs or alignment lugs 2408, locking pins or tabs 2410, alignment edges 2422 and 2424, and locking notch 2426. The cartridge carrier 2400 may be plastic, metal, or any other suitable material. In operation, the cartridge carrier 2400 holds or retains a cartridge in the space 2420 and positions the cartridge such that when the carrier 2400 is fully inserted into the inner plastic sleeve 2100 the pump assembly 2500 engages with the cartridge such that a pumping operation of the pump assembly 2500 dispenses a fluid from the cartridge.

Figure 49:
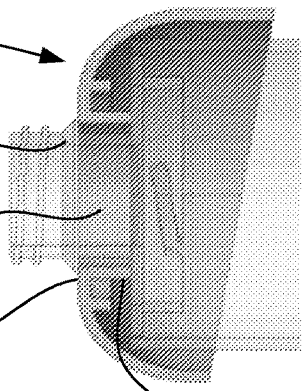
Figure 48:
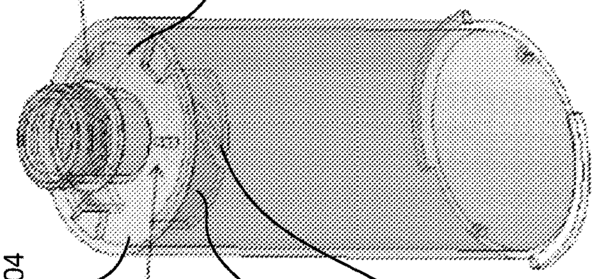
Figure 47:
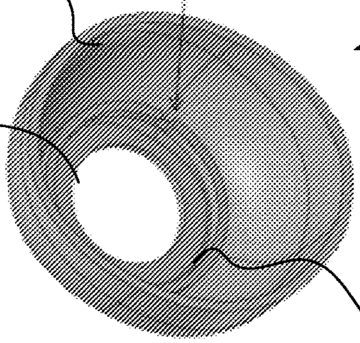

With reference now to FIGS. 47 and 48, a bottom perspective view of the upper retaining cover 2200 and a top perspective view of the inner plastic sleeve 2100 are provided. An alignment tab 2130 of the inner plastic sleeve 2100 corresponds to the notch 2208 of the upper retaining cover 2200 and aligns the upper retaining cover 2200 with the sleeve 2100 when mated to the sleeve 2100. On the inner plastic sleeve 2100 the set of tabs 2212 and 2214 each comprise a cam track or locking track such as the track 2216. These tracks correspond to the locking pins 2410 of the cartridge carrier 2400. When inserted, the pins 2410 of the cartridge carrier 2400 fit into and follow the tracks 2116 until the cartridge carrier 2400 is fully inserted and locked in place. As shown in FIG. 49, the locking collar 2110 of the threaded neck 2108 secures the threaded neck 2108 within the opening 2204 of the upper retaining cover 2200. The ring 2206 of the upper retaining cover 2200 provides proper spacing and fitment of the locking collar 2110 of the inner plastic sleeve 2110 within the opening 2204 of the upper retaining cover 2200. The outer glass sleeve 2150 would surround the inner plastic sleeve 2100 and would abut the bottom of the upper retaining cover 2200 when assembled.

Figure 51:
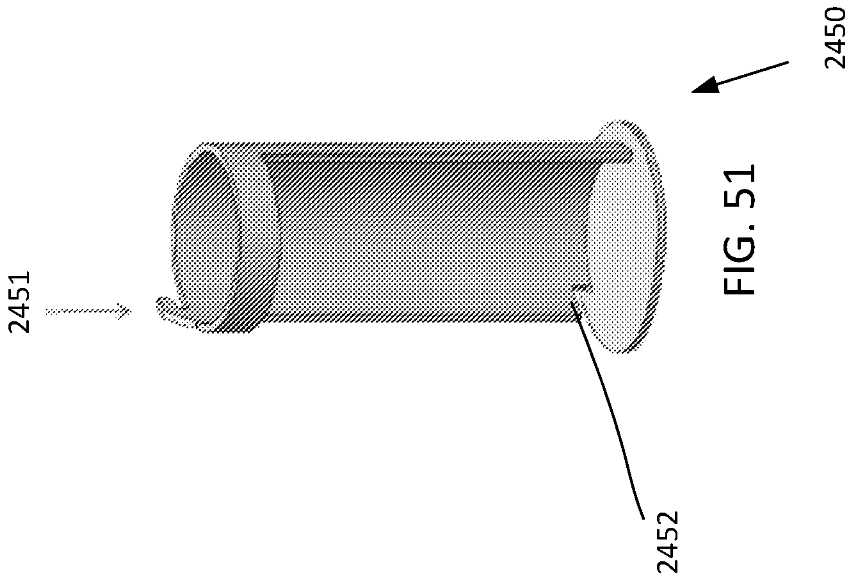
Figure 50:
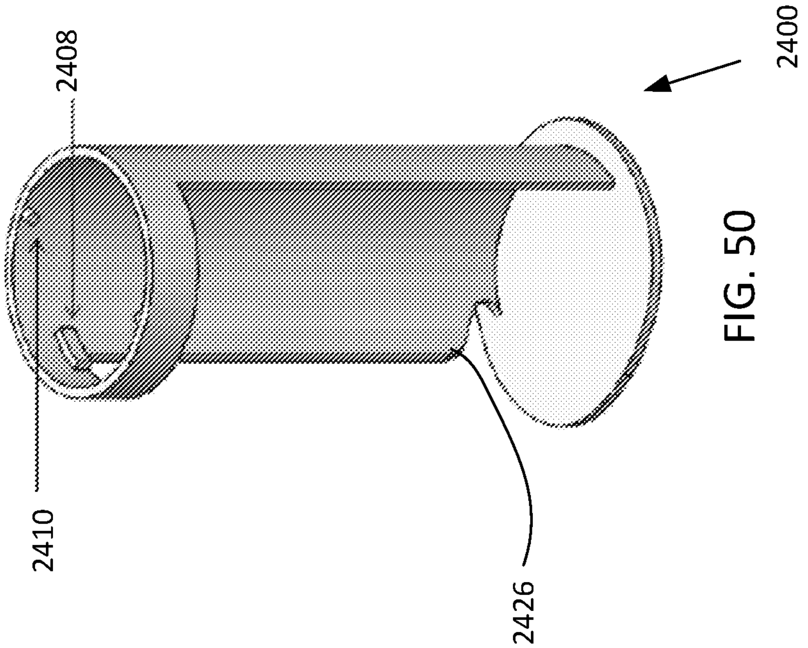

With reference now to FIGS. 50 and 51, perspective views of two alternative embodiment of a cartridge carrier are provided. The cartridge carrier 2400 is the same as the carrier 2400 shown in FIG. 45. A set of alignment or locking lugs 2408 position the carrier and cartridge correctly with respect to the inner plastic sleeve 2100. The set of locking pins or tabs 2410 engage with the locking or cam tracks 2116 of the tabs 2112 and 2114 of the inner plastic sleeve 2100 to secure the carrier 2400 and cartridge within the inner plastic sleeve 2100 when rotated into a locked position. The locking notch 2426 permits the carrier to be rotated within the inner plastic sleeve 2100 and further assists in locating and locking the carrier in an assembled or installed configuration. FIG. 51 provides a view of an alternative embodiment of a cartridge carrier. The cartridge carrier 2450 differs from the carrier 2400 in that the locking notch 2452 is more aggressively angled, and a locking tab 2451 replaces the locking lugs 2408 and locking pins 2410. The shape of the notch 2452 permits a more precise and secure fitment of the tab 2451 when engaged in a locked or installed position.

Figure 52:
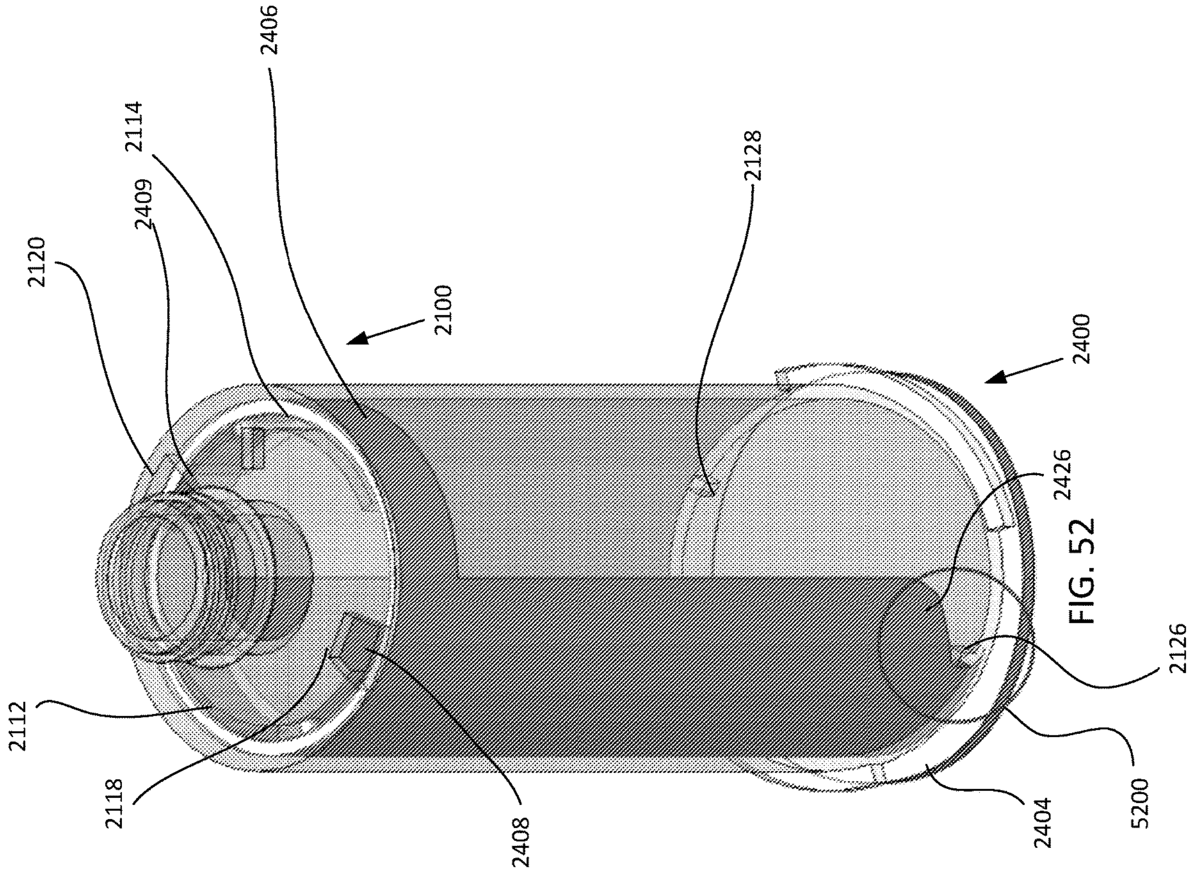

With reference now to FIG. 52, a perspective view of a cartridge carrier 2400 installed or locked into an inner plastic sleeve 2100 is provided. The operation of the carriers 1400 and 2400 is generally similar, but the carrier 2400 further comprises a set of locking lugs 2408 and 2409 and engages with the inner plastic sleeve 2100 instead of with the upper retaining cover. When engaged in an installed or locked position, the carrier 2400 has been rotated, such as by 30 degrees, into a locked position such that the locking pins 2410 are engaged with the tracks 2116 of the tabs 2112 and 2114 of the inner plastic sleeve 2100. The locking tab 2126 at the bottom of the inner plastic sleeve 2100 operates against the notch 2426 as shown in the area 5200. This tab 2126 follows the shape or contour of the notch 2426 to permit the carrier 2400 to rotate upwards into a locked or installed position. Additionally, the lugs 2408 and 2409 engage with the lug recesses 2118 and 2120 to further secure and locate the carrier 2400 when engaged into the locked or installed position and further operate to prevent unintentional disengagement. The base or bottom plate 2404 of the carrier 2400 fully abuts the bottom of the inner plastic sleeve 2100 when fully engaged in a locked or installed position or configuration.

Figure 53:
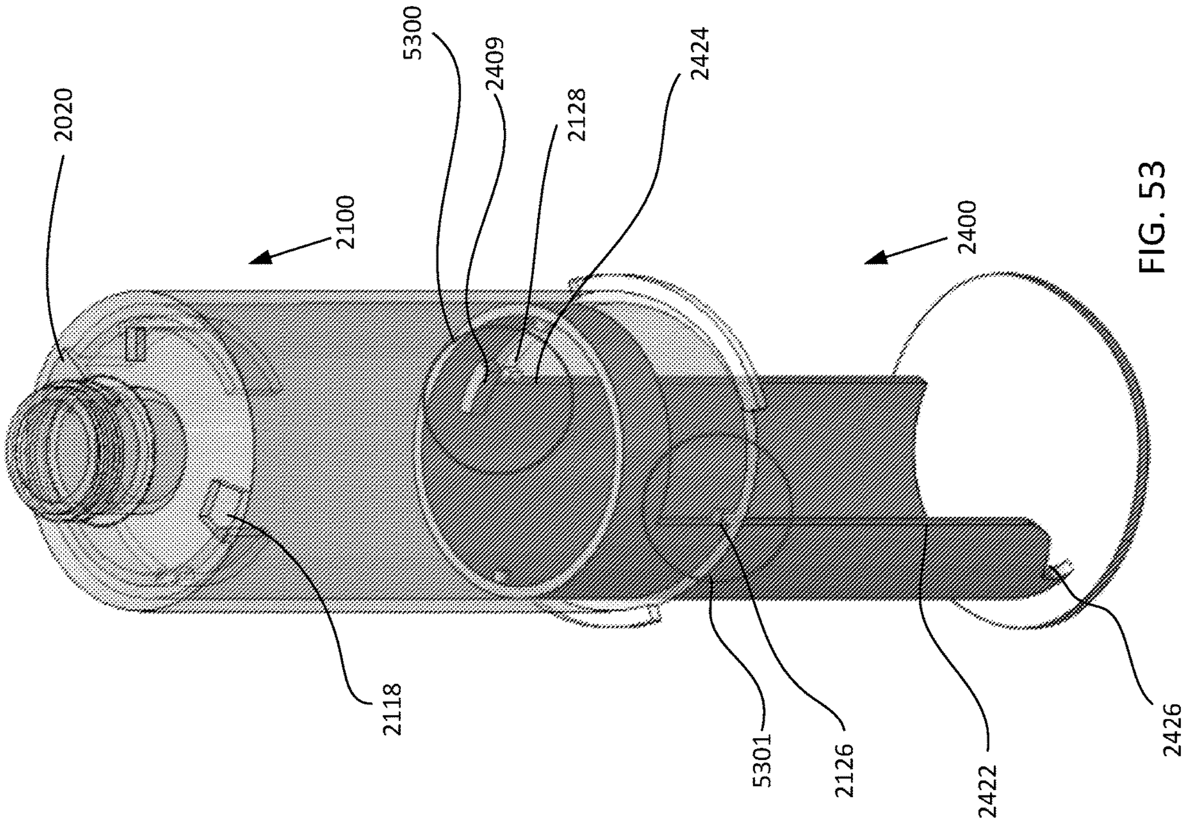
Figure 58:
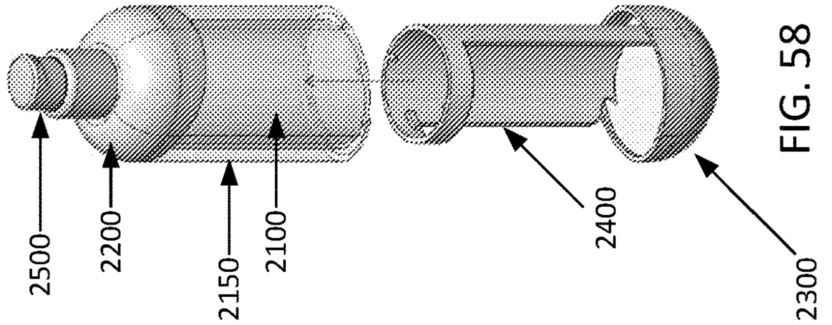
Figure 57:
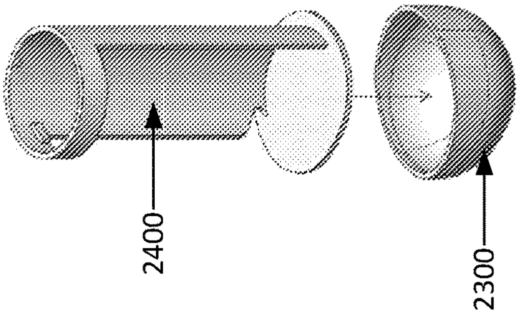
Figure 56:
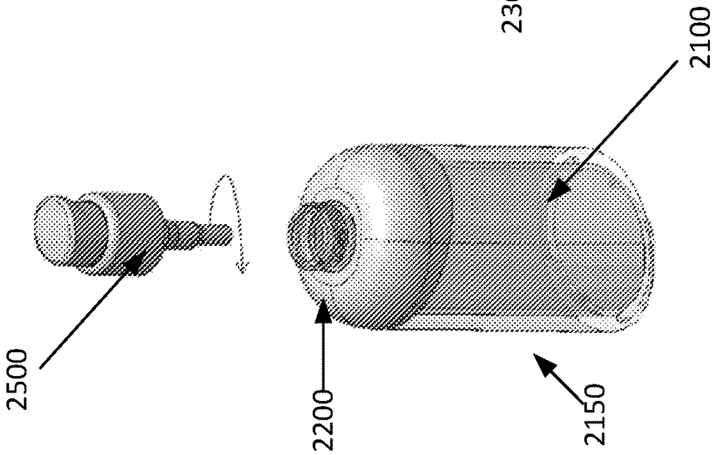
Figure 55:
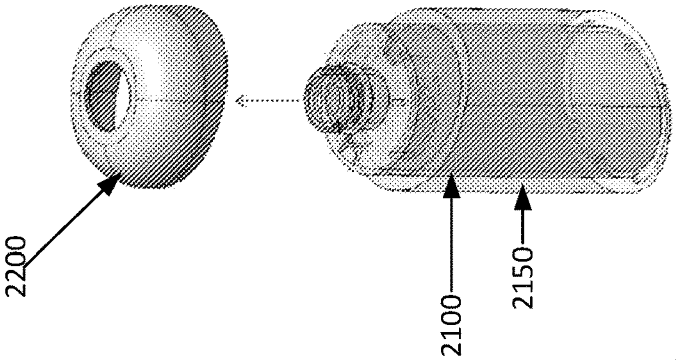

FIG. 53 illustrates the carrier 2400 partially removed from the sleeve 2100. The carrier has been counterrotated by, for example 30 degrees, to disengage the locking pins or tabs 2410 and 2126 so that the carrier 2400 can be slid down and out of the inner plastic sleeve 2100. In the area 5301 the locking tab 2126 abuts the alignment edge 2422 of the carrier 2400 and in the area 5300 the alignment edge 2424 abuts the alignment tab 2128. The tabs 2126 and 2128 follow and guide the respective edges 2422 and 2424 until the carrier 2400 is fully inserted into or removed from the sleeve 2100. When fully inserted into the sleeve 2100, the carrier 2400 may be partially rotated with the locking tab 2126 following the corresponding shape of the notch 2426 until the carrier is fully locked in place in the inner plastic sleeve 2100.

Figure 59:
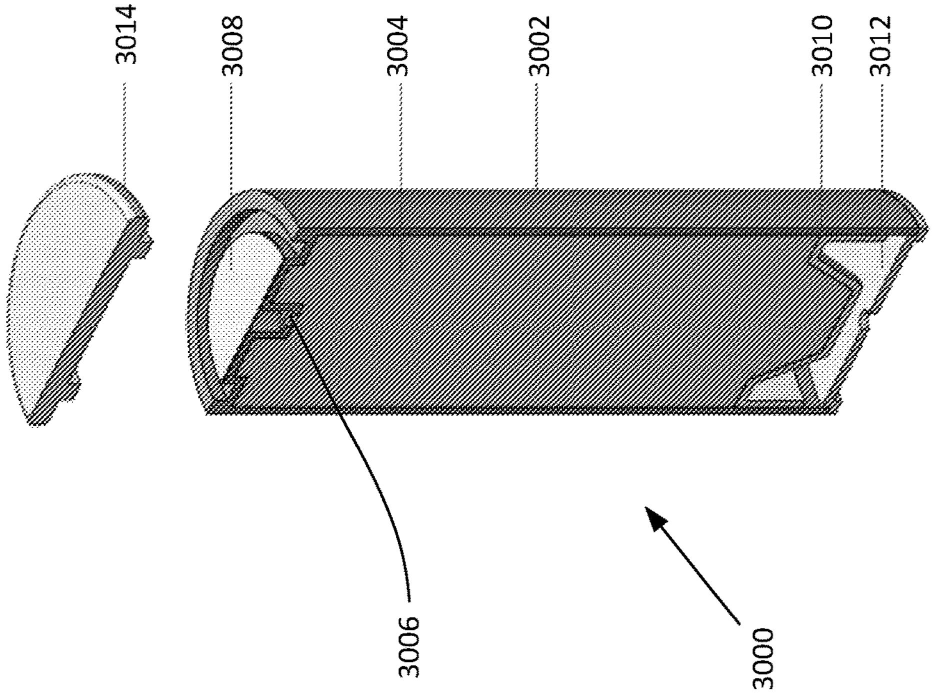
FIG. 59 provides a cross-section view of an air-less cartridge according to an embodiment of the present invention.

With reference now to FIG. 59, a cross-section view of an air-less cartridge 3000 according to an embodiment of the present invention is provided. The cartridge 3000 comprises a housing or body 3002, interior volume 3004 which would hold a liquid such as make-up, dispensing opening 3006, seal or cover 3008, piston 3010, bottom cap 3012, and top cap 3014. The seal or cover 3008 may be a foil or plastic cover to provide sterile or air-tight seal and to provide an indication of first use or tampering if damaged. As fluid is pumped from the interior volume 3004 of the cartridge 3000, the piston 3010 would move with the fluid such that no space or air would be permitted in the interior volume 3004. The cartridge 3000 may be, for example a smaller sized cartridge, for example between 30 ml and 37 ml, or a larger sized cartridge, for example between 50 ml and 60 ml. The top cap 3014 may be used to reseal a cartridge 3000 if it is removed before it has been fully used or depleted.

Figure 62:
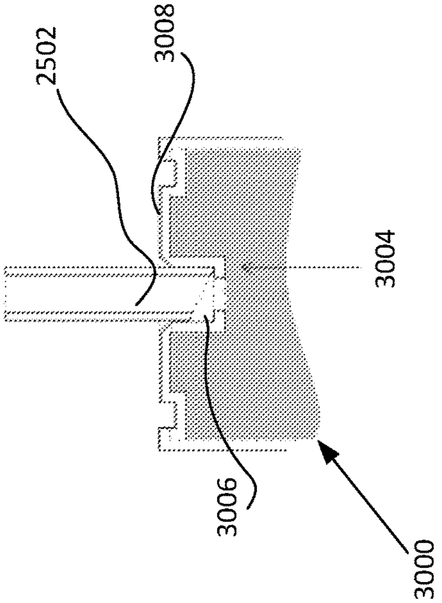
FIGS. 60-62 provide cross-section views of a pump engaging with an air-less cartridge according to an embodiment of the present invention.
Figure 61:
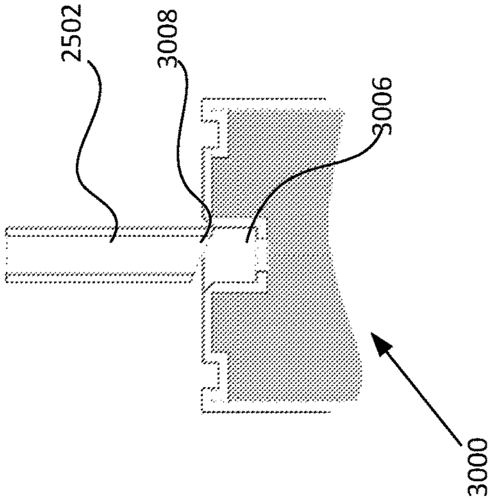
Figure 60:
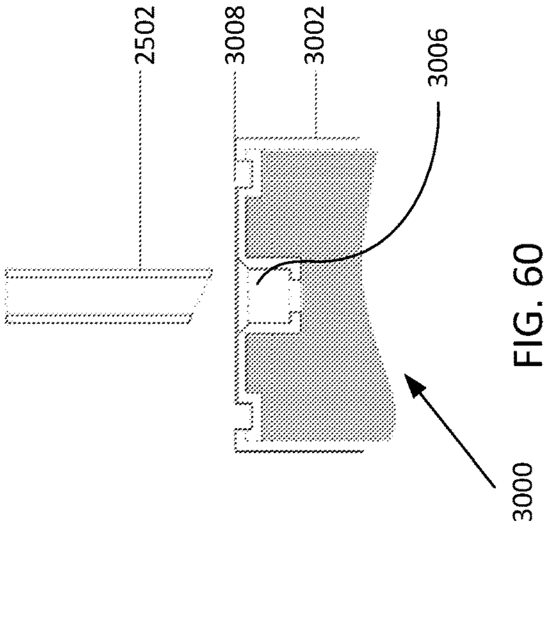

FIGS. 60-62 provide cross-section views of a pump 2502 engaging with an air-less cartridge 3000 according to an embodiment of the present invention. The pump 2502 may also be the pump 1502. In FIG. 60, as the cartridge 3000 is moved upwards by the cartridge carrier, the tip of the pump 2502 approaches the seal 3008 which covers the fluid dispensing opening 3006 of the body 3002. In FIG. 61, the tip of the pump 2502 pierces the seal or cover 3008 providing a pathway or opening for a product or fluid to flow from the interior volume 3004 through the opening 3006. In FIG. 62, the pump 2502 is fully engaged with the dispensing opening 3006 to provide a fluid-tight seal such that air may not ingress into the interior volume 3004 and to permit the fluid or product to flow from the interior volume 3004 through the dispensing opening 3006 when the pump 2502 is operated.

Figure 68:
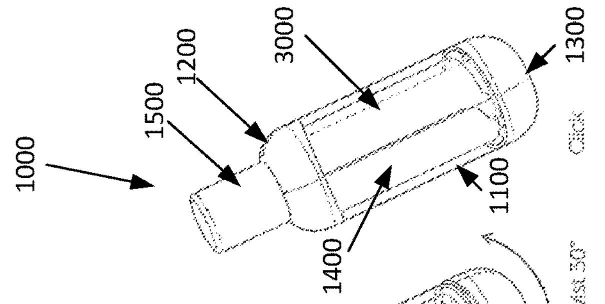
FIGS. 63-68 provide a set of perspective views of the steps for installing an air-less cartridge into the air-less cartridge dispensing system having a one-piece sleeve housing according to an embodiment of the invention.
Figure 67:
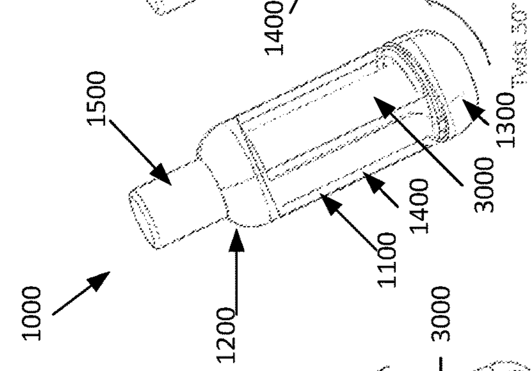
Figure 66:
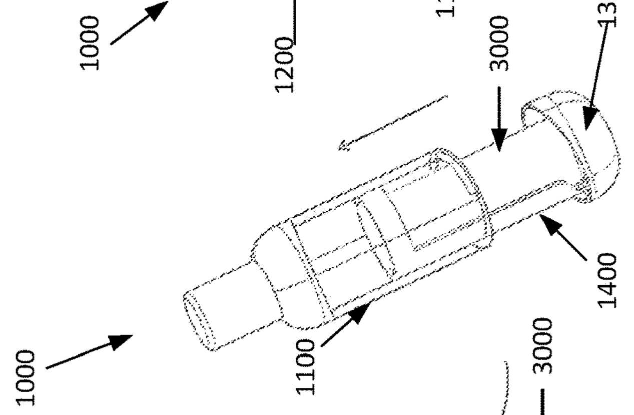
Figure 65:
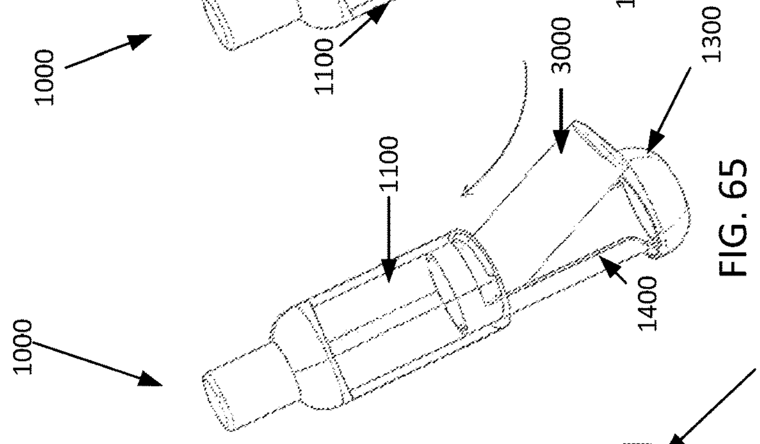
Figure 64:
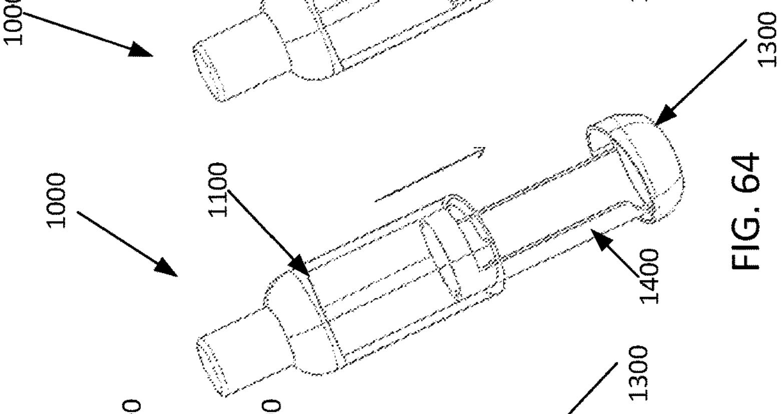
Figure 63:
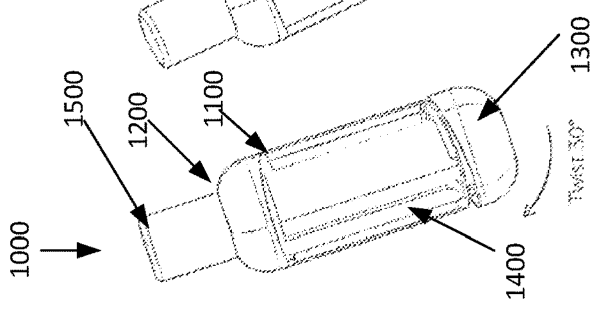

FIGS. 63-68 provide a set of perspective views of the steps for installing an air-less cartridge 3000 into the air-less cartridge dispensing system 1000 having a one-piece sleeve housing. A similar process would be used with the dispensing system 2000. When empty and with no cartridge installed in the dispensing system 1000, the lower retaining cover 1300 may be manually rotated, such as by 30 degrees, to disengage the carrier 1400 from the upper retaining cover 1200. The carrier 1400 may then be moved downwards to provide an opening for the insertion of a cartridge 3000. The cartridge 3000 is then inserted into the carrier 1400. With the cartridge inserted into the carrier 1400, the cartridge 3000, carrier 1400, and lower retaining cover 1300 may be moved or operated upwards or inwards as guided by the locking and guiding tabs of the sleeve 1100. When moved fully upwards, the pump assembly 1500, shown under a cap, engages with the cartridge 3000 as shown in FIGS. 61-62. The lower retaining cover 1300 may then be rotated to fully engage the cartridge 3000 and carrier 1400 in a locked or installed position with the sleeve 1100 until a click is heard as shown in FIG. 68.

Figure 71:
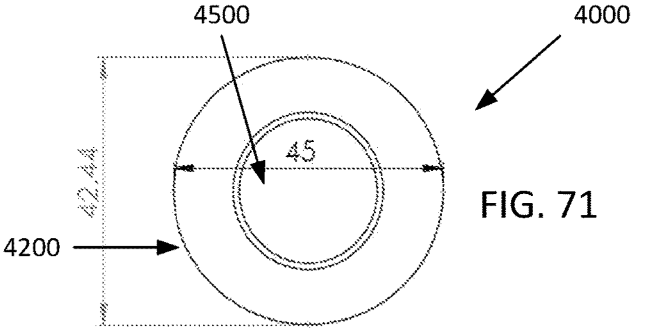
FIG. 71 provides a top plan view of an air-less cartridge dispensing system according to an embodiment of the invention.
Figure 69:
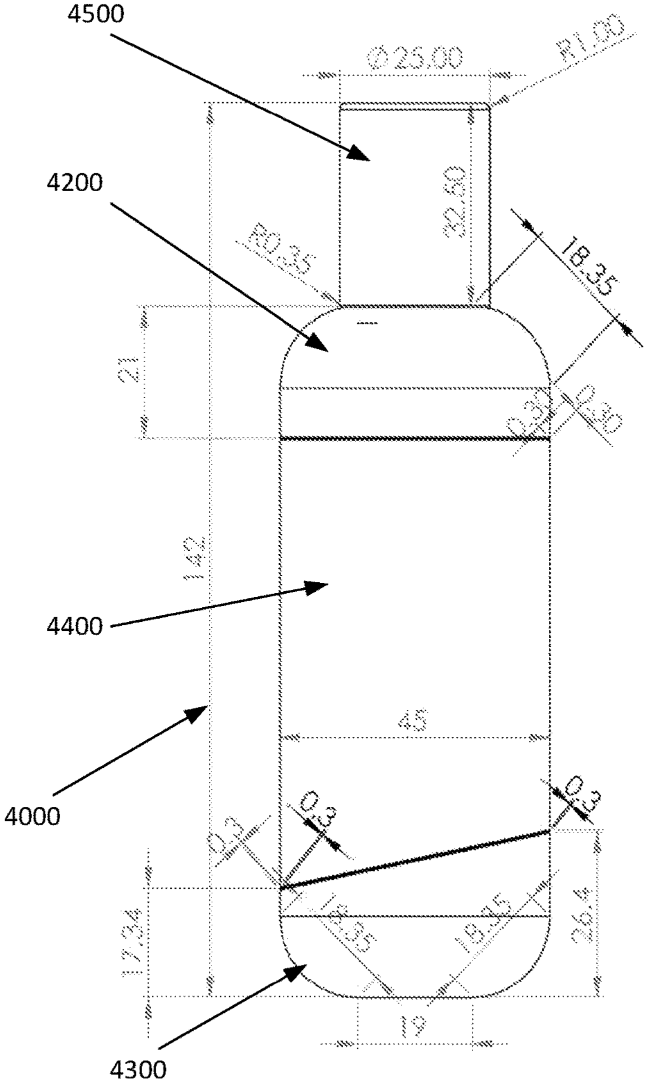
FIG. 69 provides a front view of an air-less cartridge dispensing system according to an embodiment of the invention.
Figure 70:
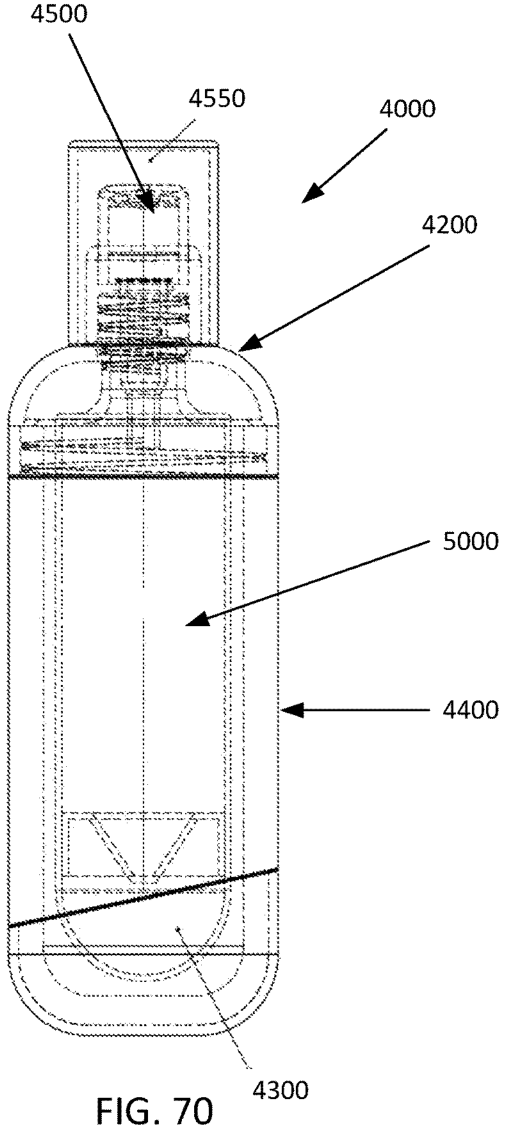
FIG. 70 provides a front view of an air-less cartridge dispensing system and further provides an illustrative view of the internal components of the air-less cartridge dispensing system according to an embodiment of the invention.

With reference now to FIG. 69 a front view of an air-less cartridge dispensing system 4000 according to an embodiment of the invention is provided. The air-less cartridge dispensing system 4000 provides benefits similar to the systems shown in FIGS. 1-68, but further provides additional simplicity and ease of operation in removing, installing, or replacing air-less cartridges within the system. The air-less cartridge dispensing system 4000 comprises an upper retaining cover 4200, lower cover 4300, sleeve or housing 4400, pump assembly 4500, and air-less cartridge 5000. FIG. 70 provides a front view of the air-less cartridge dispensing system 4000 and further provides an illustrative view of the internal components of the air-less cartridge dispensing system 4000. Specifically, the pump assembly 4500 can be seen inside the pump cover 4550 and the air-less cartridge 5000 can be seen in a mated or engaged position (i.e., fully threaded into) the pump assembly 4500. The lower cover 4300 is press or friction fit onto the sleeve or housing 4400, but may also be further secured by a suitable adhesive. The housing 4400 is engaged or mated with the upper retaining cover 4200 by threading or screwing the housing 4400 into the upper retaining cover 4200. FIG. 71 provides a top plan view of the air-less cartridge dispensing system. The dimensions shown in FIGS. 69 and 71 are intended to be exemplary and are not limiting of the design of the air-less cartridge dispensing system 4000, which may be increased or decreased in size as is desired or necessary for certain product types to be dispensed by or compatible with the system.

Figure 72:
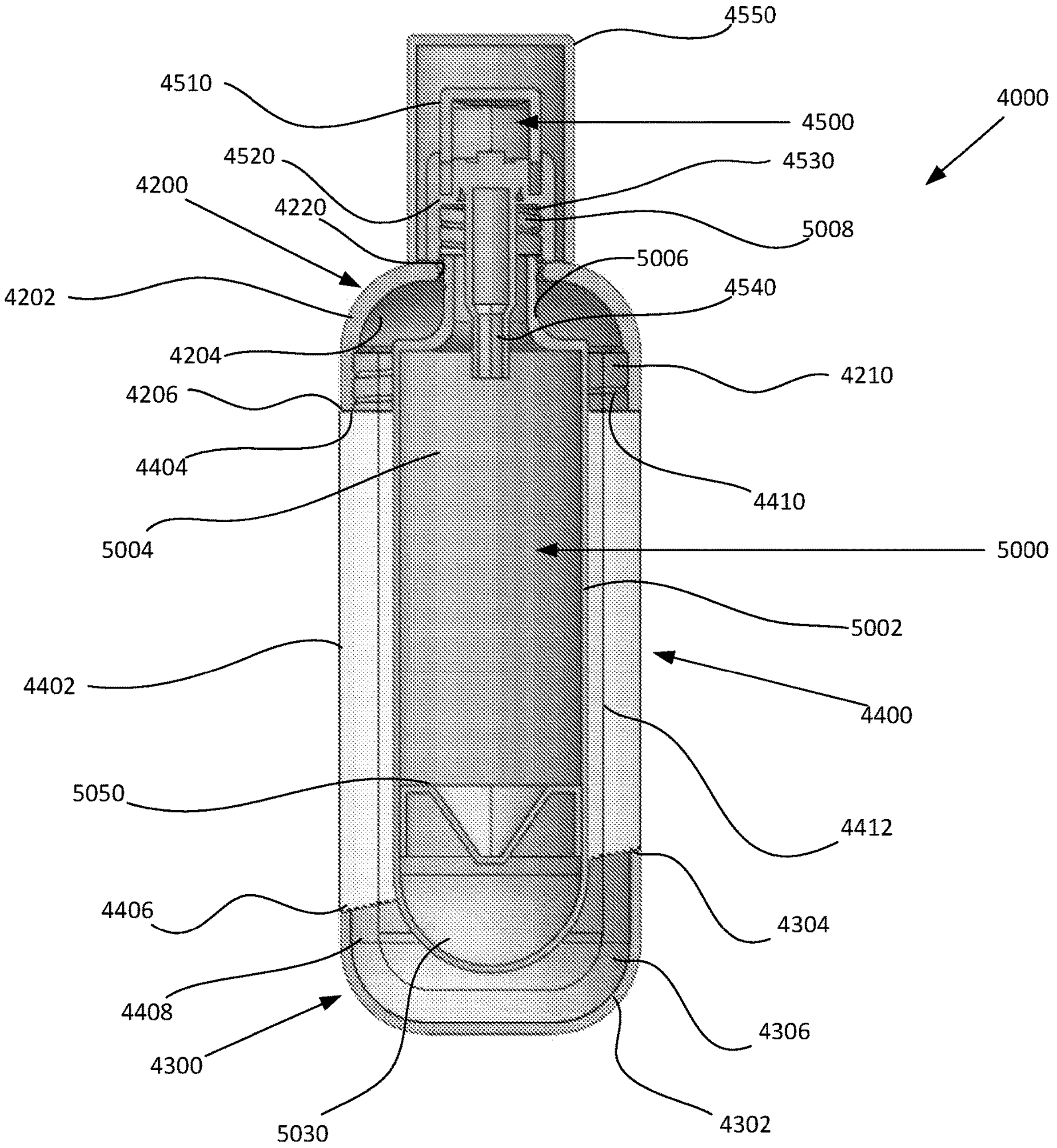
FIG. 72 provides a front, vertical cross-section view of an air-less cartridge dispensing system according to an embodiment of the invention.

With reference now to FIG. 72 a front, vertical cross-section view of the air-less cartridge dispensing system 4000 is provided. In this cross-section view, cross-sections of the upper retaining cover 4200, lower cover 4300, sleeve or housing 4400, pump assembly 4500, and air-less cartridge 5000 of the air-less cartridge dispensing system 4000 are provided. The upper retaining cover comprises a body or shell 4202, an interior 4204, a bottom 4206, a threaded interior portion 4210, and a pump opening 4220. The lower cover 4300 comprises a body or shell 4302, a top 4304, and an interior 4306. The shell or housing 4400 comprises a body 4402, top lip or edge 4404, bottom lip or edge 4406, a curved or partially curved or dome shaped bottom portion 4408, threaded upper portion 4410, and interior volume or space 4412. The pump assembly comprises a pump head 4510, pump housing 4520, an interior threaded portion 4530 of the housing 4520, a pump engine 4540, and a pump cap or cover 4550. The air-less cartridge 5000 comprises a body 5002, interior product volume 5004, neck 5006, threaded neck portion 5008, void volume 5030, and piston 5050.

In assembly of the air-less cartridge dispensing system 4000, or for installation of an air-less cartridge 5000, the neck 5006 of the air-less cartridge 5000 is positioned within the pump opening 4220 of the upper retaining cover 4200 and the threaded neck portion 5008 is threaded into the corresponding threads of the interior threaded portion 4530 of the pump assembly 4500 until the air-less cartridge 5000 is fully engaged with the pump assembly 4500. When fully engaged or mated with the housing 4520 of the pump assembly 4500, a fluid or product transfer channel is formed such that a fluid or product in the interior 5004 of the air-less cartridge 5000 may be dispensed by the pump assembly 4500 by user operation of the pump head 4510 such as by depressing the pump head 4510. This operation of the pump head 4510 by a user causes the product to be drawn by the pump engine 4540 through to an opening on the pump head 4510. As product is dispensed from the air-less cartridge 5000, the piston 5050 operates or moves upwards by an amount or distance corresponding to the volume of product dispensed. The size of the void volume 5030 increases by an amount corresponding to the volume of the product dispensed.

The housing 4400 is secured to the upper retaining cover 4200 by engaging or mating the housing 4400 with the upper retaining cover by threading the upper threaded portion 4410 onto the corresponding threads of the threaded interior portion 4210 and rotating the housing 4400, such as by 90 degrees, until fully engaged. The threading on the housing 4400 and upper retaining cover 4200 provides for simple removal or installation of the housing on the cover to improve the overall user experience. In one example, a total rotation of 90 degrees is required to install or remove the housing 4400 which provides the user with a premium and repeatable experience. Similarly, the threading on the air-less cartridge 5000 and pump assembly 4500 provides for a simplified installation and removal process of the air-less cartridge 5000 that does not require specific alignment or configuration by a user. In one embodiment, the threading on the pump assembly 4500 and air-less cartridge may be timed such that a logo or label on the air-less cartridge is consistently oriented towards the front of the air-less cartridge dispensing system 4000 when the air-less cartridge is installed.

The configuration of the air-less cartridge dispensing system 4000 improves over cumbersome and complicated existing systems and devices and provides an improved and simplified user experience. Additionally, a cover may be provided for the air-less cartridge 5000 to be placed over the neck 5006 and threaded neck portion 5008 when the air-less cartridge 5000 is not installed in the air-less cartridge dispensing system 4000.

Figure 74:
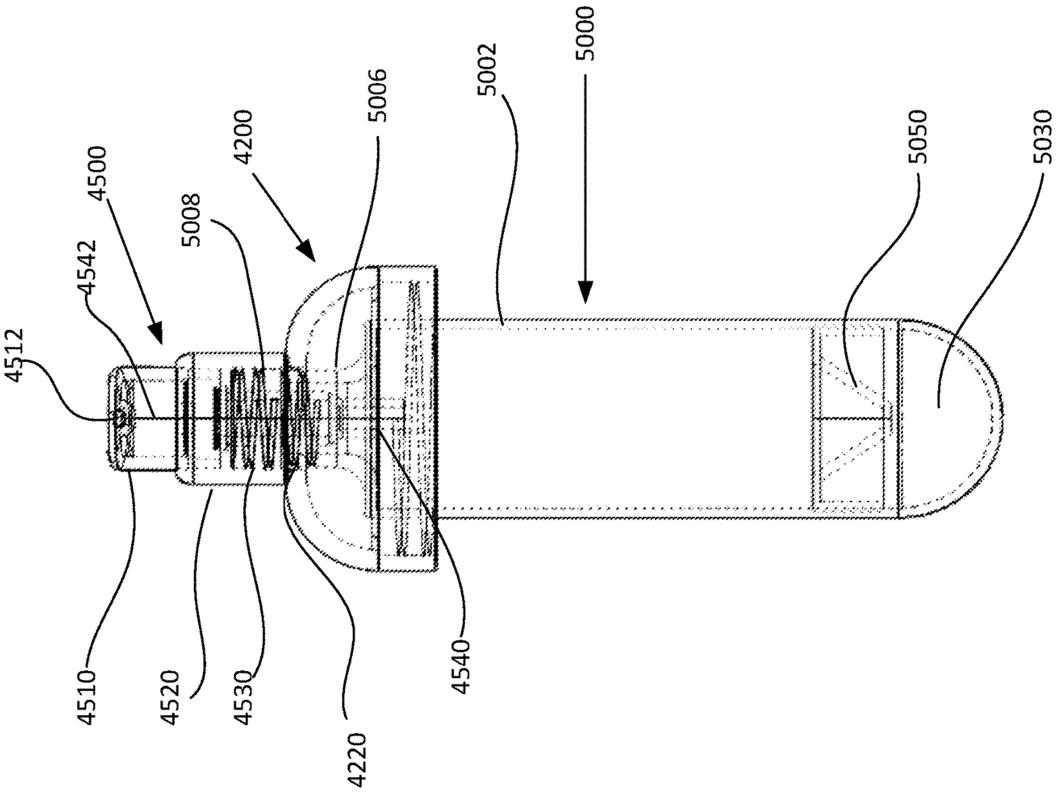
FIG. 74 provides a front view with a partial internal view of a pump assembly, upper retaining cover, and air-less cartridge assembly of an air-less cartridge dispensing system according to an embodiment of the invention.
Figure 73:
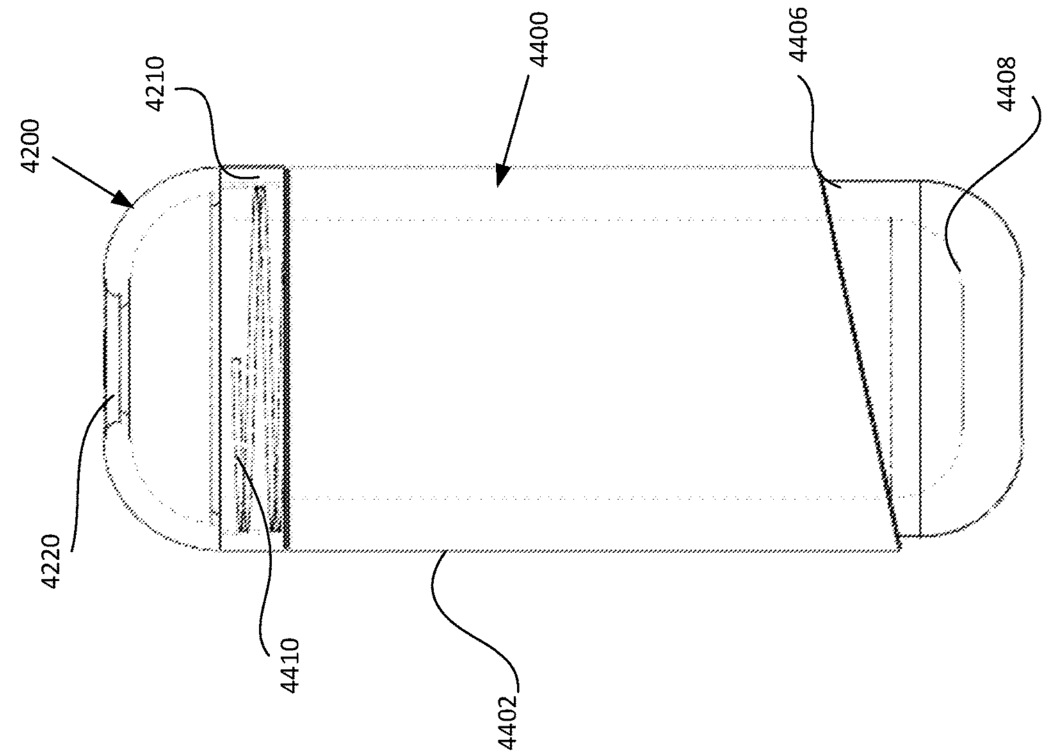
FIG. 73 provides a front view with a partial internal view of an upper retaining cover and glass housing of an air-less cartridge dispensing system according to an embodiment of the invention.
Figure 75:
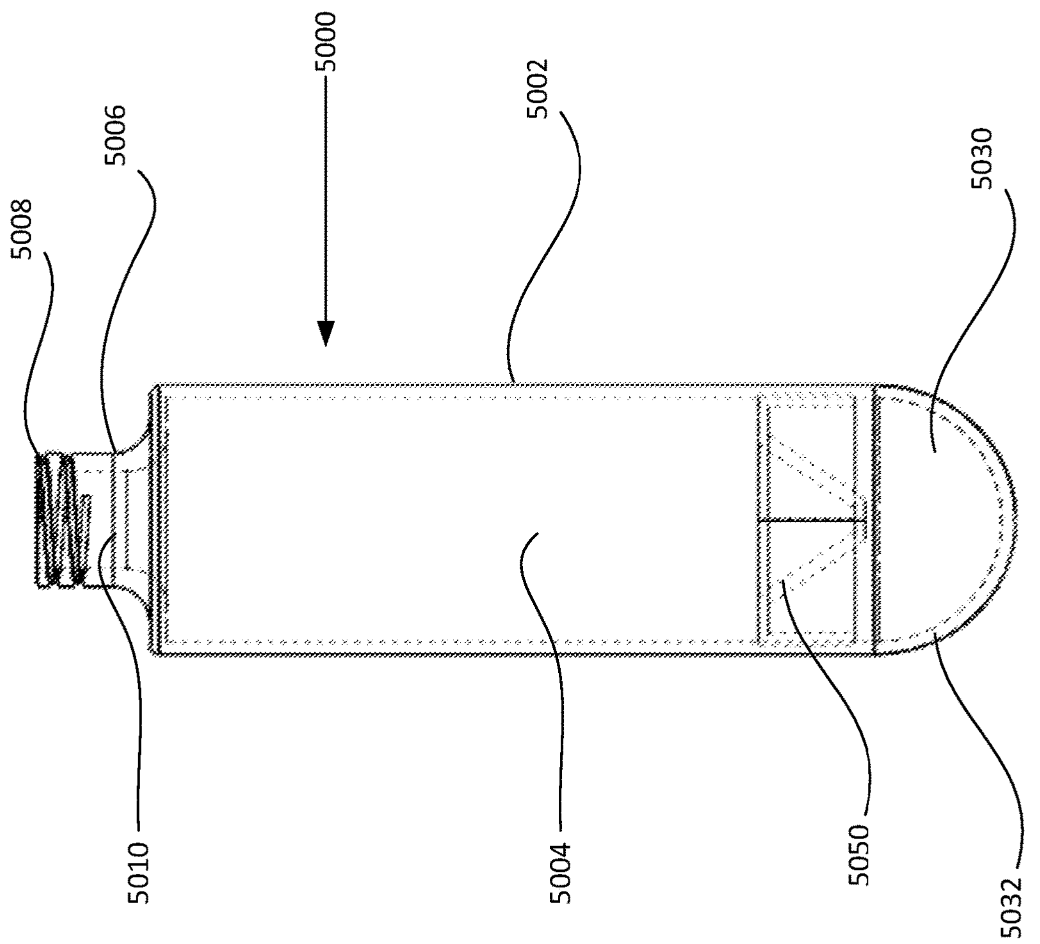
FIG. 75 provides a front view with a partial internal view of an air-less cartridge assembly according to an embodiment of the invention.

FIGS. 73-75 provide views of various sub-assemblies of the air-less cartridge dispensing system 4000. With reference now to FIG. 73, a front view with a partial internal view of an upper retaining cover 4200 and glass housing 4400 of an air-less cartridge dispensing system are provided. The housing 4400 is shown fully mated with or engaged with the upper retaining cover 4200 by the threading of the upper threaded portion 4410 into the interior threaded portion 4210 of the upper retaining cover. FIG. 74 provides a front view with a partial internal view of a pump assembly 4500, upper retaining cover 4200, and air-less cartridge assembly 5000 of the air-less cartridge dispensing system 4000. The air-less cartridge 5000 is mated or engaged with the pump assembly 4500 by threading the threaded neck portion 5008 into the interior threaded portion 4530 of the pump assembly 4500. Product may be dispensed by operation of the pump head 4510 of the pump assembly 4500 to cause a product to flow or move from the interior 5004 of the air-less cartridge 5000 by the pump engine 4540. Product moves through the product path or channel 4542 to be dispensed through the opening 4512 in the pump head 4510. FIG. 75 provides a front view with a partial internal view of an air-less cartridge assembly 5000. Product is disposed within the interior 5004 of the air-less cartridge 5000 and the piston 5050 is installed in the interior 5004 whereafter a cap 5032 is affixed to the cartridge 5000 to form a void volume 5030 in which no product is disposed. An opening 5010 at the top of the cartridge 5000 receives the pump engine 4540 when the cartridge 5000 is engaged with or installed on the pump assembly 4500.

Figure 78:
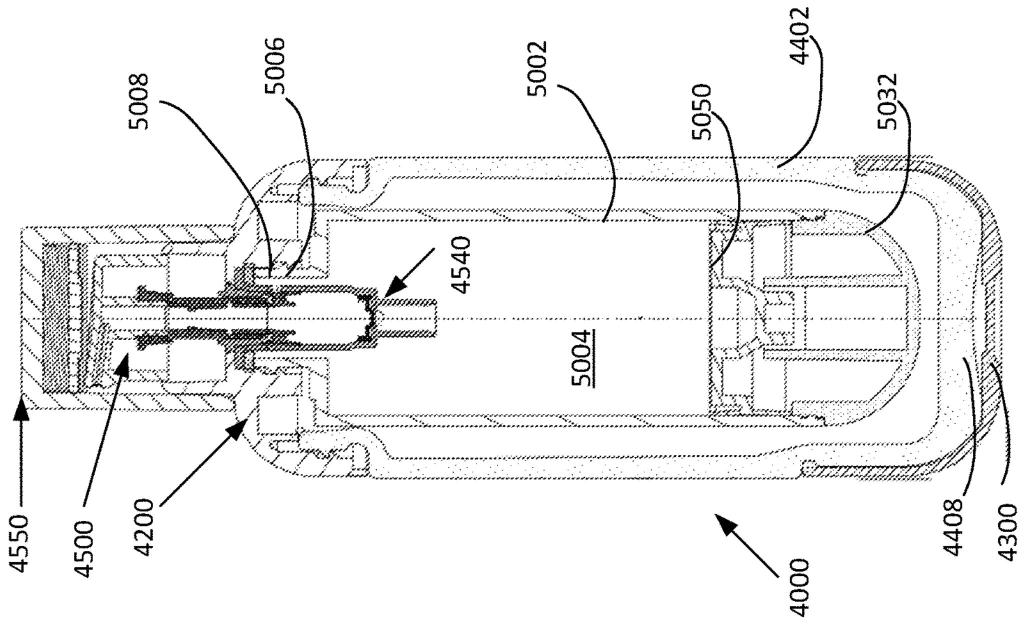
FIGS. 76-78 provide respective views of an alternative air-less cartridge dispensing system according to an embodiment of the invention.
Figure 77:
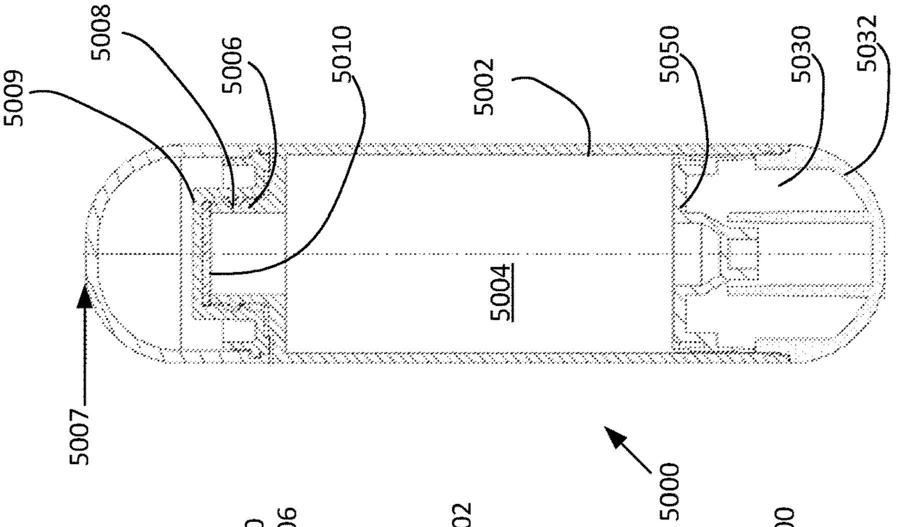
Figure 76:
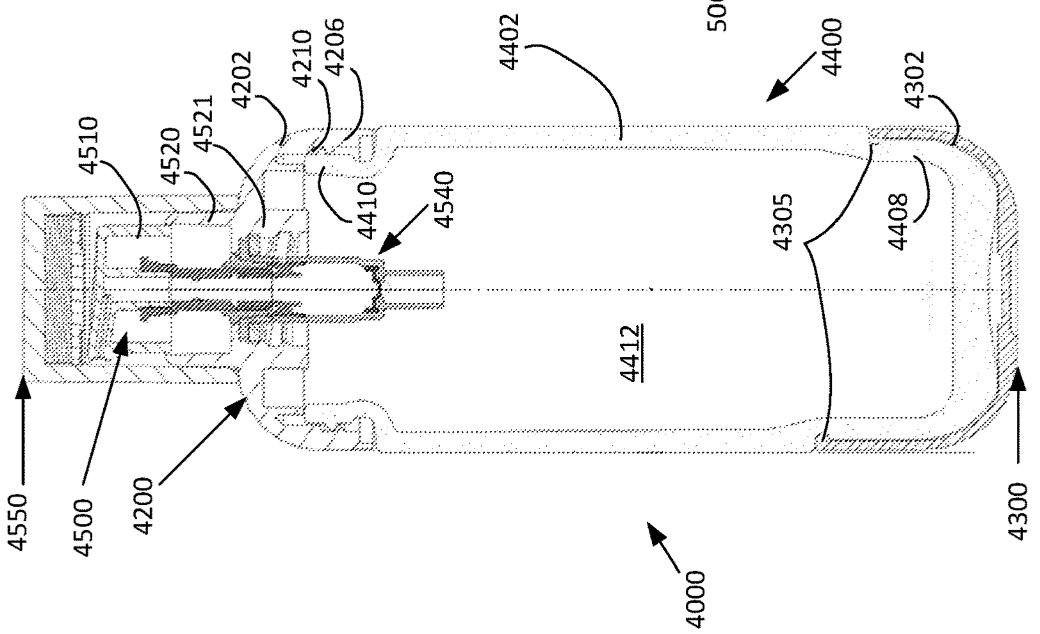

FIGS. 76-78, discussed in more detail below, provide respective views of an alternative air-less cartridge dispensing system 4000. FIG. 76 shows an empty, assembled dispensing system 4000 having upper retaining cover 4200 and lower cover 4300 connected at opposite ends of housing 4400 and having pump assembly 4500 and cap or top 4550 covering same. FIG. 77 shows an exemplary air-less cartridge 5000, for placement within the empty dispensing system of FIG. 76 and having a to piece cover or cap or top 5007 with threaded component 5009 as shown in place and covering the top 5010 and threaded onto threaded portion 5008 of neck 5006. At the opposite end of the cartridge 5000, piston 5050 defines one limit of internal void or volume or cavity 5004 in which cosmetic product is received and, once the cartridge is operationally placed within the housing 4400 of dispensing system 4000, may be dispensed to a user operating the dispenser. FIG. 78 shows an assembled dispensing system 4000 complete with air-less cartridge 5000 secured in place and ready for use. As is shown, the top or cap assembly 5007/5009 has been removed from the cartridge 5000 and discarded and the top 5010 of the cartridge 5000 has been pierced or the like to allow penetration of the pump engine 4540 of the pump assembly 4500 into the chamber or cavity 5004 to bring the channels comprising the pump engine in fluid communication with the product stored in the cavity.

With reference now to FIG. 76, a front, vertical cross-section view of an empty air-less cartridge dispensing system 4000 is provided. In this cross-section view, cross-sections of the upper retaining cover 4200, lower cover 4300, sleeve or housing 4400, and pump assembly 4500 (without air-less cartridge 5000) of the air-less cartridge dispensing system 4000 are provided. The upper retaining cover 4200 comprises a body or shell 4202, a bottom 4206 having a threaded interior portion 4210 for securely and removably mating with a threaded portion 4410 of the upper end of dispensing housing 4400. The upper retaining cover 4200 also includes an integral pump housing portion 4520 including a threaded bore or annular recess 4521 defining a pump opening through which pump assembly 4500 is received. In this manner the upper retaining cover 4200 and the pump assembly 4500 may be an integrated sub-assembly for connecting to housing 4400. The threaded bore or annular recess 4521 is adapted to securely receive a threaded portion 5008 of neck 5006 of air-less cartridge 5000 when it is placed in the cavity 4412 of housing 4000. The lower cover 4300 comprises a body or shell 4302, a top circumferential lip or edge 4305 defining an enlarged portion for being matingly received in a hollow or recess formed in the lower portion 4408 of dispensing housing 4400. In this manner the lower cover may be "snapped" in place by allowance of plastic deformation upon sufficient force exerted to position the lip or edge 4305 within the circumferential recess formed in the housing 4400. In this manner a variety of different lower covers may be selectively used to complete a dispensing system 4000. The shell or housing 4400 comprises a body 4402, a threaded circumferential top lip or edge 4410, a curved or partially curved or dome-shaped bottom portion 4408, which collectively define an interior volume or space or cavity 4412. The pump assembly 4500 comprises a pump head 4510, pump housing 4520, a pump engine 4540, and a pump cap or cover 4550.

With reference to FIG. 77, an air-less cartridge 5000 comprises a body 5002 defining an interior product volume or cavity or reservoir 5004 and having neck 5006, threaded neck portion 5008, void or volume 5030, and piston 5050. In this example, prior to use the cartridge 5000 is provided with a two-piece cover having a dome-shaped cover 5007 and a threaded annulus or ring 5009 that is threaded onto threaded neck portion 5008. A top 5010 is exposed with the cover 5007 removed and is brought into piercing engagement with pump engine 4540 or is otherwise pierced or removed to permit the cartridge 5000 to be placed within the cavity 4412 of dispensing housing 4000 and to permit the pump assembly 4500 to be disposed within product reservoir 5004 as shown in FIG. 78.

With reference to FIG. 78, in assembly of the air-less cartridge dispensing system 4000, or for removal of a first cartridge 5000 and for installation of a replacement air-less cartridge 5000, the upper retaining cover 4200 is twisted off using the mating threads 4210/4410 to disassemble the upper retaining portion from the dispensing housing 4400 so as to reveal and expose the cavity 4412. Next, and with the cover 5007 removed from the top of cartridge 5000, the upper retaining cover 4200/pump assembly 4500 is positioned opposite the neck 5006 and is rotatably threaded onto the neck 5006 of the air-less cartridge 5000 to securely attach the cartridge with the combined upper retaining cover/pump assembly. Prior to securing the cartridge to the pump assembly, the top 5010 may be removed or pierced in some fashion to allow penetration of the pump engine 4540 into cavity 5004 of the cartridge. Alternatively, as the components are "screwed on" or rotatably joined, the pump engine may be configured, e.g., a sharp tapered end, to pierce through a covering, e.g., plastic or aluminum layer covering the top 5010, to achieve penetration into the cavity 5004 and to the cosmetic product contained therein. In this manner, replacement cartridges may be loaded into the dispensing system 4000 to change out product as desired by users, thereby extending the life of the dispensing system product and avoiding costly and environmentally unfriendly frequent discarding of dispensing products—only the cartridge needs to be discarded and alternatively it may be configured to allow for return to manufacturer for refilling.

Next, the combined or assembled cartridge 5000/upper retaining cover 4200/pump assembly 4500 is placed into the cavity 4412 with the lower portion 5032 of the cartridge disposed proximate to the lower portion 4408 of housing 4400. The oppositely threaded portion within the pump opening 4220 of the upper retaining cover 4200 and the threaded neck portion 5008 is threaded into the corresponding threads of the interior threaded portion 4530 of the pump assembly 4500 until the air-less cartridge 5000 is fully engaged with the pump assembly 4500. When fully engaged or mated with the housing 4520 of the pump assembly 4500, a fluid or product transfer channel is formed such that a fluid or product in the interior 5004 of the air-less cartridge 5000 may be dispensed by the pump assembly 4500 by user operation of the pump head 4510 such as by depressing the pump head 4510. This operation of the pump head 4510 by a user causes the product to be drawn by the pump engine 4540 through to an opening on the pump head 4510. As product is dispensed from the air-less cartridge 5000, the piston 5050 operates or moves upwards by an amount or distance corresponding to the volume of product dispensed. The size of the void volume 5030 increases by an amount corresponding to the volume of the product dispensed.

The housing 4400 is secured to the upper retaining cover 4200 by engaging or mating the housing 4400 with the upper retaining cover by threading the upper threaded portion 4410 onto the corresponding threads of the threaded interior portion 4210 and rotating the housing 4400, such as by 90 degrees, until fully engaged. The threading on the housing 4400 and upper retaining cover 4200 provides for simple removal or installation of the housing on the cover to improve the overall user experience. In one example, a total rotation of 90 degrees is required to install or remove the housing 4400 which provides the user with a premium and repeatable experience. Similarly, the threading on the air-less cartridge 5000 and pump assembly 4500 provides for a simplified installation and removal process of the air-less cartridge 5000 that does not require specific alignment or configuration by a user. In one embodiment, the threading on the pump assembly 4500 and air-less cartridge may be timed such that a logo or label on the air-less cartridge is consistently oriented towards the front of the air-less cartridge dispensing system 4000 when the air-less cartridge is installed.

The cover may be adapted to allow piercing penetration of the dispenser pump portion or pump engine installed into the reservoir and to provide a close-fit around the dispenser pump portion or pump engine so that when the dispenser pump portion is removed from the reservoir the cover acts as a wiper to remove residual cosmetic product from the dispenser pump portion to provide a cleaner cartridge removal process.

In addition, and optionally, a first mechanical feedback component, such as complimentary debossed lines, may be included and disposed on the air-less cartridge and the retaining cover at the point of connection. The mechanical feedback may be configured to provide user feedback, such as a clicking sound and/or a physical indication during a screwing connection, during cartridge installation to indicate proper installation of the air-less cartridge in the dispenser.

In addition, and optionally, a second mechanical feedback component, such as complimentary debossed lines, may be disposed on the dispenser body and the retaining cover at the point of connection. The mechanical feedback may be configured to provide user feedback during connection of the retaining cover and the body, such as a clicking sound and/or a physical indication during a screwing connection.

Figure 79:
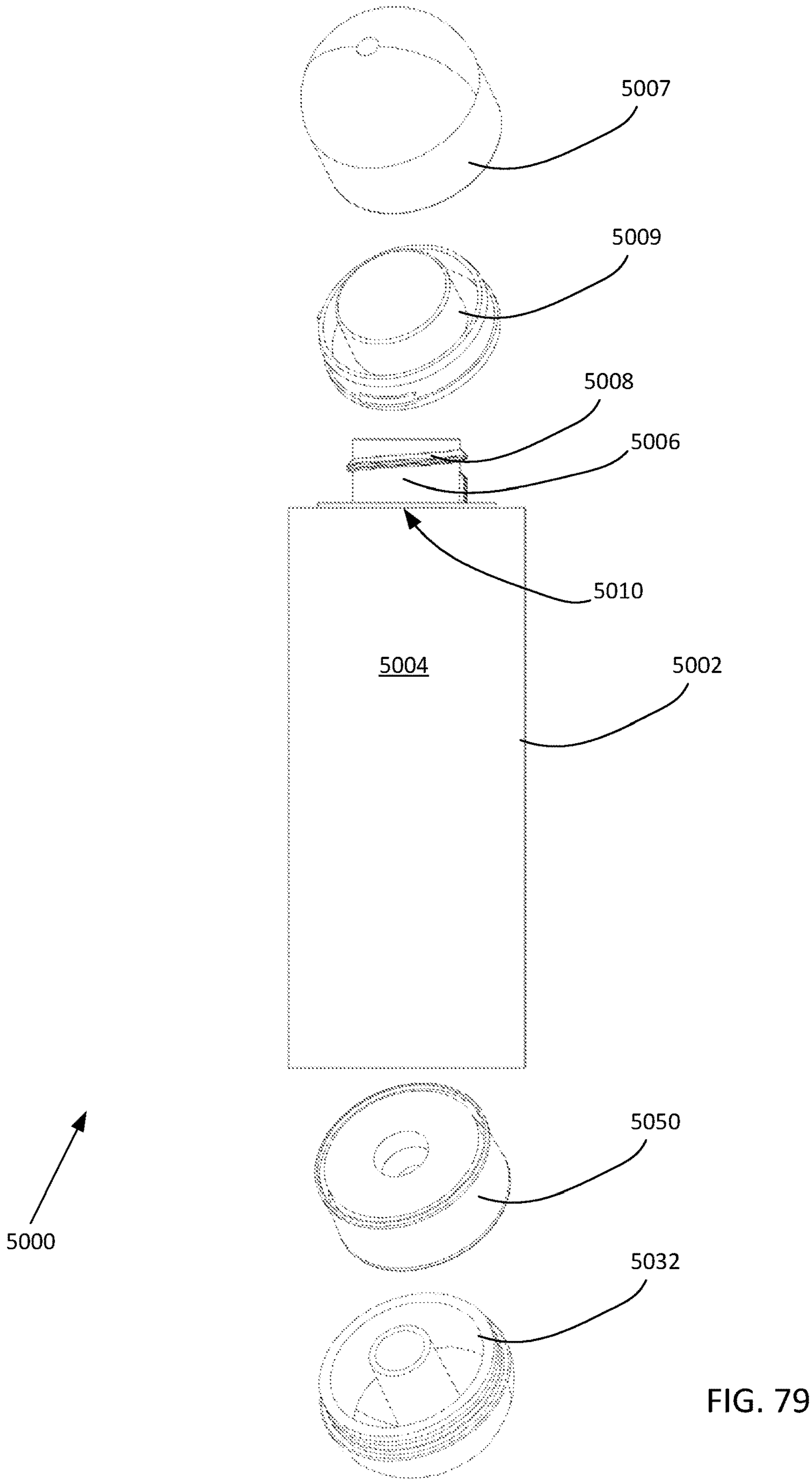
FIG. 79 provides an exploded view of an air-less cartridge for use in the dispensing system of the present invention.

FIG. 79 is an exploded view of the air-less cartridge 5000 separate from the dispensing system 4000. A cap 5007 may be provided for the air-less cartridge 5000 to be placed over the neck 5006 and threaded neck portion 5008 when the air-less cartridge 5000 is not installed in the air-less cartridge dispensing system 4000 to protect the cover disposed at the opening of the cartridge. The cap 5007 provides protection of the cover and opening to prevent unwanted spillage of the fluid cosmetic product contained in the cartridge reservoir 5004 defined by cylindrical body or shell 5002. The cap 5007 may be, for example, two-piece in construction and include an intermediate component 5009 that screws on or otherwise attaches to the neck 5006 and may be adapted to securely attach the cap 5007 to the assembled cartridge 5000. A piston is disposed in a bottom portion or end of the cartridge shell 5002 and a securing end cap 5032 may be used to seal the bottom portion of the body 5002 and to retain positioning of the piston 5050 and prevent leakage of the fluid cosmetic product contained in the reservoir 5004. A cavity or void is defined by the end cap 5032 and the piston 5050 such that during a pump operation of the dispensing system the piston is allowed to move upwards and into the reservoir as fluid cosmetic product is evacuated out of the cartridge. The void correspondingly expands as the piston moves into the reservoir and as fluid is released, dispensed or expelled from the dispenser.

While the invention has been described by reference to certain preferred embodiments, it should be understood that numerous changes could be made within the spirit and scope of the inventive concept described. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A dispenser and replaceable cartridge system comprising a dispenser adapted to removably receive a replaceable air-less cartridge and dispense a fluid cosmetic product contained in a replaceable cartridge, the dispenser and replaceable air-less cartridge system comprising:

a depressible pump head having an opening for dispensing cosmetic product;

a pump housing adapted to support the depressible pump head and having a first connector portion configured to connect the pump housing with a replaceable air-less cartridge;

a pump engine supported by the pump housing, operable by the depressible pump head, and having defined therein a fluid path adapted to be at least partially disposed within a replaceable air-less cartridge, the fluid path allowing flow of cosmetic product contained in the replaceable air-less cartridge to the depressible pump head opening;

a retaining cover comprising a body having a pump opening adapted to receive therethrough at least a portion of the pump engine and a first fixation portion adapted to connect the retaining cover to a dispenser body;

a replaceable air-less cartridge being sealed and self-contained prior to installation in the pump housing and defining a cosmetic product reservoir, the replaceable air-less cartridge having a second connector portion adapted to matingly connect the replaceable air-less cartridge to the pump housing at the first connector portion, and having an opening through which the pump engine is at least partially received into the reservoir;

the replaceable airless cartridge further comprising:

a cover disposed over the opening and adapted to prevent spillage of fluid cosmetic product contained in the reservoir prior to installation of the replaceable air-less cartridge in a dispenser, the cover being displaceable to permit a portion of the dispenser pump to be disposed within the reservoir upon installation of the replaceable air-less cartridge in a dispenser;

a seal cover disposed over the replaceable air-less cartridge opening and configured to be removed or pierced to permit access to the fluid contained in the reservoir by the pump assembly when installed;

a piston disposed at the bottom and at least partially in the reservoir opposite the dispenser pump when the replaceable air-less cartridge is installed in a dispenser; and a fluid cosmetic product disposed in the reservoir;

the dispenser body having an opening at one end and defining an interior configured to receive the replaceable air-less cartridge, the dispenser body having a second fixation portion adapted to connect the dispenser body with the retaining cover at the first fixation portion to enclose the body interior with the replaceable air-less cartridge contained therein;

whereby depressing the depressible pump head causes cosmetic fluid contained in the replaceable air-less cartridge reservoir to flow through the fluid path of the pump engine and through and out the opening in the pump head.

2. The dispenser of claim 1, wherein the retaining cover first connector is threaded and the replaceable air-less cartridge second connector is a threaded neck, and the retaining cover and the air-less cartridge are secured together by threading and screwing the first and second connectors together.

3. The dispenser of claim 1, wherein the body first fixation portion is threaded and the retaining cover second fixation portion is threaded and the body and retaining cover are secured together by threading and screwing the first and second fixation portions together and whereby the first and second fixation portions may be unscrewed to disconnect the body from the retaining cover to permit removal of the replaceable air-less cartridge and insertion of a replacement air-less cartridge and re-connecting of the body with the retaining cover.

4. The dispenser of claim 1, wherein a pump sub-assembly comprises the depressible pump head, the pump housing, and the pump engine, and wherein the pump housing is formed integral to the retaining cover.

5. The dispenser of claim 1, wherein the piston and the body are cylindrical in shape with the piston disposed at an end of the reservoir opposite the pump engine.

6. The dispenser of claim 5, wherein the air-less cartridge piston is disposed opposite the replaceable air-less cartridge opening and includes a first surface in contact with the cosmetic fluid product contained in the reservoir and a second surface adjacent a void area formed in the air-less cartridge opposite the pump engine, whereby the piston moves toward the pump engine as the depressible pump head is depressed and cosmetic product is pumped out of the reservoir and the void grows as a function of the pump-action.

7. The dispenser of claim 1, wherein the replaceable air-less cartridge comprises a cap detachably affixed to the replaceable air-less cartridge over the opening to protect the cover from damage.

8. The dispenser of claim 1, wherein the dispenser body is a cylindrical glass sleeve.

9. The dispenser of claim 8, further comprising a bottom cover attached to the dispenser body opposite the depressible pump head and made of a material other than glass for protecting the glass sleeve from accidental breakage.

10. The dispenser of claim 9, wherein the bottom cover comprises a shape corresponding to a curved bottom portion of the sleeve and is friction-fit over the curved bottom portion of the sleeve.

11. The dispenser of claim 1, wherein the piston is disposed at least partially in the reservoir, a fluid cosmetic product disposed in the reservoir, and wherein upon operation of the depressible pump head the product in the reservoir is moved through the pump engine and out of the pump head, and the piston moves by an amount corresponding to a volume of the product dispensed.

12. The dispenser of claim 1 further comprising one or both of the following:

a first mechanical feedback component disposed on the air-less cartridge and the retaining cover and configured to provide user feedback during replaceable air-less cartridge installation to indicate proper installation of the replaceable air-less cartridge in the dispenser;

a second mechanical feedback component disposed on the dispenser body and the retaining cover and configured to provide user feedback during connection of the retaining cover and the body.

13. A sealed and self-contained air-less cartridge for use in a dispenser, the dispenser having a housing, the housing including a retaining cover and a dispenser body and adapted to removably receive a sealed and self-contained air-less cartridge and a pump adapted to dispense a fluid cosmetic product contained in the sealed and self-contained air-less cartridge, the sealed and self-contained air-less cartridge comprising:

a body having a top and a bottom and generally defining a cosmetic product reservoir therebetween and configured to be received within a dispenser shell, the top including an opening through which a portion of a dispenser pump is received into the reservoir and is in fluid contact with a fluid cosmetic product contained in the reservoir, the body having a neck portion proximate the opening and being configured to be received through the retaining cover;

a connector portion disposed at the top and adapted to matingly connect the air-less cartridge to the dispenser pump;

a cover disposed over the opening and adapted to prevent spillage of fluid cosmetic product contained in the reservoir prior to installation of the cartridge in the dispenser, the cover being displaceable to permit a portion of the dispenser pump to be disposed within the reservoir upon installation of the cartridge in the dispenser;

a seal cover disposed over the replaceable airless cartridge opening and configured to be removed or pierced to permit access to the fluid contained in the reservoir by the pump assembly when installed;

a piston disposed at the bottom and at least partially in the reservoir opposite the dispenser pump when the cartridge is installed in a dispenser; and a fluid cosmetic product disposed in the reservoir;

wherein with the cartridge installed in a dispenser and upon operation of the dispenser pump, the fluid cosmetic product in the reservoir moves through the dispenser pump and out a dispenser opening and the piston moves by an amount corresponding to a volume of the product dispensed.

14. The sealed and self-contained air-less cartridge of claim 13, wherein the air-less cartridge connector portion is a threaded neck and the dispenser includes a retaining cover having an oppositely threaded connector, whereby the retaining cover and the air-less cartridge are secured together by threading and screwing the threaded neck and the oppositely threaded connector together.

15. The sealed and self-contained air-less cartridge of claim 13, wherein the air-less cartridge piston is disposed opposite the air-less cartridge opening and includes a first surface in contact with the cosmetic fluid product contained in the reservoir and a second surface adjacent a void area formed at the bottom of the air-less cartridge opposite the dispenser pump, whereby upon operation of the pump the piston moves toward the top of the body as cosmetic product is pumped out of the reservoir and the void grows as a function of the pump-action.

16. The sealed and self-contained air-less cartridge of claim 13 further comprising a cap detachably affixed to the cartridge over the opening to protect the cover from damage.

17. The sealed and self-contained air-less cartridge of claim 13 wherein the cover is adapted to allow piercing penetration of the dispenser pump portion installed into the reservoir and to provide a close-fit around the dispenser pump portion so that when the dispenser pump portion is removed from the reservoir the cover acts as a wiper to remove residual cosmetic product from the dispenser pump portion to provide a cleaner cartridge removal process.

* * * * *